United States Patent [19]
Hedges et al.

[11] Patent Number: 5,604,534
[45] Date of Patent: Feb. 18, 1997

[54] DIRECT DIGITAL AIRBORNE PANORAMIC CAMERA SYSTEM AND METHOD

[75] Inventors: Thomas M. Hedges, Great Falls, Va.; David G. Weir, Ormond Beach, Fla.; Jerry A. Speasl, Pleasanton, Calif.

[73] Assignee: Omni Solutions International, Ltd., Vienna, Va.

[21] Appl. No.: 449,350

[22] Filed: May 24, 1995

[51] Int. Cl.$^6$ .............................. H04N 5/33; H04N 7/18
[52] U.S. Cl. .................... 348/144; 348/61; 348/106; 348/113; 348/116; 348/117; 348/145
[58] Field of Search .......................... 348/61, 106, 113, 348/116, 117, 135, 144, 145; 364/449; 395/127

[56] References Cited

U.S. PATENT DOCUMENTS

| | | | |
|---|---|---|---|
| 3,066,589 | 12/1962 | Beatty | 95/12.5 |
| 3,294,903 | 12/1966 | Goldmark et al. | 178/6.8 |
| 3,660,594 | 5/1972 | Marsh | 348/144 |
| 4,143,971 | 3/1979 | Levy et al. | 356/404 |
| 4,442,453 | 4/1984 | Verdier | 358/109 |
| 4,496,972 | 1/1985 | Lippmann et al. | 358/109 |
| 4,516,158 | 5/1985 | Grainge et al. | 358/109 |
| 4,682,160 | 7/1987 | Beckwith, Jr. et al. | 395/127 |
| 4,774,572 | 9/1988 | Kellar et al. | 358/109 |
| 4,796,090 | 1/1989 | Fraier | 358/211 |
| 4,814,711 | 3/1989 | Olsen et al. | 348/144 |
| 4,829,304 | 5/1989 | Baird | 364/449 |
| 5,166,789 | 11/1992 | Myrick | 348/164 |
| 5,204,818 | 4/1993 | Landecker et al. | 348/116 |
| 5,247,356 | 9/1993 | Ciampa | 348/135 |
| 5,248,979 | 9/1993 | Orme et al. | 348/144 |
| 5,267,042 | 11/1993 | Tsuchiya | 348/144 |
| 5,353,055 | 10/1994 | Hiramatsu | 348/144 |
| 5,381,338 | 1/1995 | Wysocki et al. | 348/116 |
| 5,414,462 | 5/1995 | Veatch | 348/135 |
| 5,481,479 | 1/1996 | Wight et al. | 348/144 |

*Primary Examiner*—Thai Q. Tran
*Assistant Examiner*—Frank Snow
*Attorney, Agent, or Firm*—Christie, Parker & Hale, LLP

[57] ABSTRACT

An airborne direct digital panoramic camera system and method in which an in-line electro-optical sensor eliminates the need for photographic film and film transport apparatus normally associated with prior art airborne reconnaissance cameras and yet still retains the very high image resolution quality which is so important in intelligence operations and commercial geographic information systems (GIS), mapping and other remote sensing applications. The system provides a simpler, more efficient and less costly panoramic camera by utilizing a lens in conjunction with the electro-optical line array sensor wherein the lens can be simpler and less expensive than a framing camera because it essentially requires quality focus in only one dimension and by eliminating the burden and delay necessitated in film processing and development. The massive amounts of digital data generated by the camera are compressed and any motion or panoramic errors are easily correctable in the digital data, while such errors were nearly impossible to correct in a cost effective fashion from film images. The compressed digital image data may be stored and retrieved later for utilization in computer type networks or alternatively can be transmitted from the aircraft to a ground station for prompt utilization.

42 Claims, 11 Drawing Sheets

DIRECT DIGITAL AIRBORNE PANORAMIC CAMERA SYSTEM AND METHOD

BACKGROUND OF THE INVENTION

The present invention relates to airborne panoramic camera systems and more particularly to a direct digital panoramic camera system and method in which an electro-optical digital sensor eliminates the need for the film and film transport apparatus normally associated with prior art airborne reconnaissance cameras.

Airborne camera reconnaissance or surveillance systems are nearly as old as the use of military and civilian aircraft. The prior art camera or photo reconnaissance systems generally involved camera photos taken from an aircraft flying over the area of interest, and the exposed film was returned to the ground after the flight where it was developed and processed before it could be delivered to the intelligence agencies or groups who could then determine whether the photographs contain the desired intelligence. A number of prior art reconnaissance systems, including those disclosed in U.S. Pat. No. 3,066,589, disclose an airborne reconnaissance system which includes an airborne film processing, scanning and transmission of the data to associated ground stations. U.S. Pat. No. 4,143,971 discloses an airborne photo reconnaissance system in which photo cells and color filter techniques are employed to identify specific targets of interest which have an unique optical or IR pattern. U.S. Pat. No. 4,442,453 discloses a combined film and electro-optical sensor for converting the exposed film to data suitable for relay over a radio link to a ground station where it may be demultiplexed and displayed on television type monitors.

The above-described and other similar prior art photo reconnaissance systems employ film as the light-sensing medium and therefore have the attendant drawbacks of a bulky film system and film transport apparatus, delays in developing the film and further generally include a more complex and substantially more costly lens that utilize a square focal plane system which must focus in two dimensions.

It is therefore a primary object of the present invention to prove an improved airborne panoramic camera system and method which is less costly and more efficient in operation.

It is another object of the present invention to provide a direct digital airborne panoramic camera system and method in which an electro-optical sensor eliminates the need for the film and film transport apparatus of the prior art airborne camera systems.

It is yet another object of the present invention to provide an improved airborne panoramic camera system and method in which panoramic errors are easily correctable in the digital image data.

It is yet another object of the present invention to provide an improved airborne panoramic camera system and method which employs a simplified, less costly optical system.

It is yet another object of the present invention to provide a direct digital, massive data rate airborne panoramic camera and system capable of efficiently supporting mapping and other remote sensing applications by producing massive data bases which are efficiently organized and appropriate for use with geographic information systems.

It is yet another object of the present invention to provide a direct digital airborne panoramic camera system and method which eliminates the need for photographic film in airborne data collection process.

It is yet another object of the present invention to provide an improved airborne panoramic camera system and method having high image quality data particularly with respect to contrast and dynamic range.

It is yet another object of the present invention to provide an improved direct digital airborne panoramic camera system and method in which the images may be conveniently, accurately, and easily geo-referenced.

It is a further object of the present invention to provide an improved direct digital airborne panoramic camera system and method in which the massive amounts of digitized image data are rapidly and efficiently available to the user in computer friendly formats.

These and other advantages of the present invention will become more apparent from the following detailed description taken in conjunction with the illustrative embodiments shown in the accompanying drawings.

SUMMARY OF THE INVENTION

The present invention relates to an improved airborne, direct digital panoramic camera system and method in which an in-line, electro-optical sensor eliminates the need for photographic film and film transport apparatus normally associated with prior art airborne reconnaissance cameras and yet still retains the very high image resolution quality which is so important in intelligence operations and in commercial geographic information systems (GIS), mapping and other remote sensing applications. The present invention provides a simpler, more efficient and less costly panoramic camera by utilizing a simplified optical system in conjunction with the electro-optical line array sensor wherein the lens can be simpler and less expensive because it essentially requires quality focus in only one dimension and in only one place. The massive amounts of digital data generated by the camera are compressed, and any motion induced or panoramic errors are easily correctable in the digital data while such errors were nearly impossible to correct in film images. The compressed digital image data may be stored and retrieved later for utilization in computer type networks or alternatively can be transmitted from the aircraft to a ground station for prompt utilization.

DETAILED DESCRIPTION

In today's rapidly changing world of instant communications, governmental agencies, private businesses and the news media require more intelligence in ever more detail and from more remote locations thus making the efficient, flexible gathering of image information more critical every day. Panoramic airborne cameras are a key to these new mission requirements due to their ability to collect, in a very short time, massive data on geographically dispersed areas at very high image quality. For example, at IQ-7, a panoramic camera at an altitude of 5000 feet in one hour can collect imagery data covering more than 500 square miles which yields over 87 gigabytes of compressed digital image data. This is the equivalent of 87,000 3-½" floppy disks which, as will be recognized by those skilled in the digital memory arts, is a massive volume of data, and the extremely high data rates involved present substantial problems in terms of system design, cost and implementation.

Figure 1:
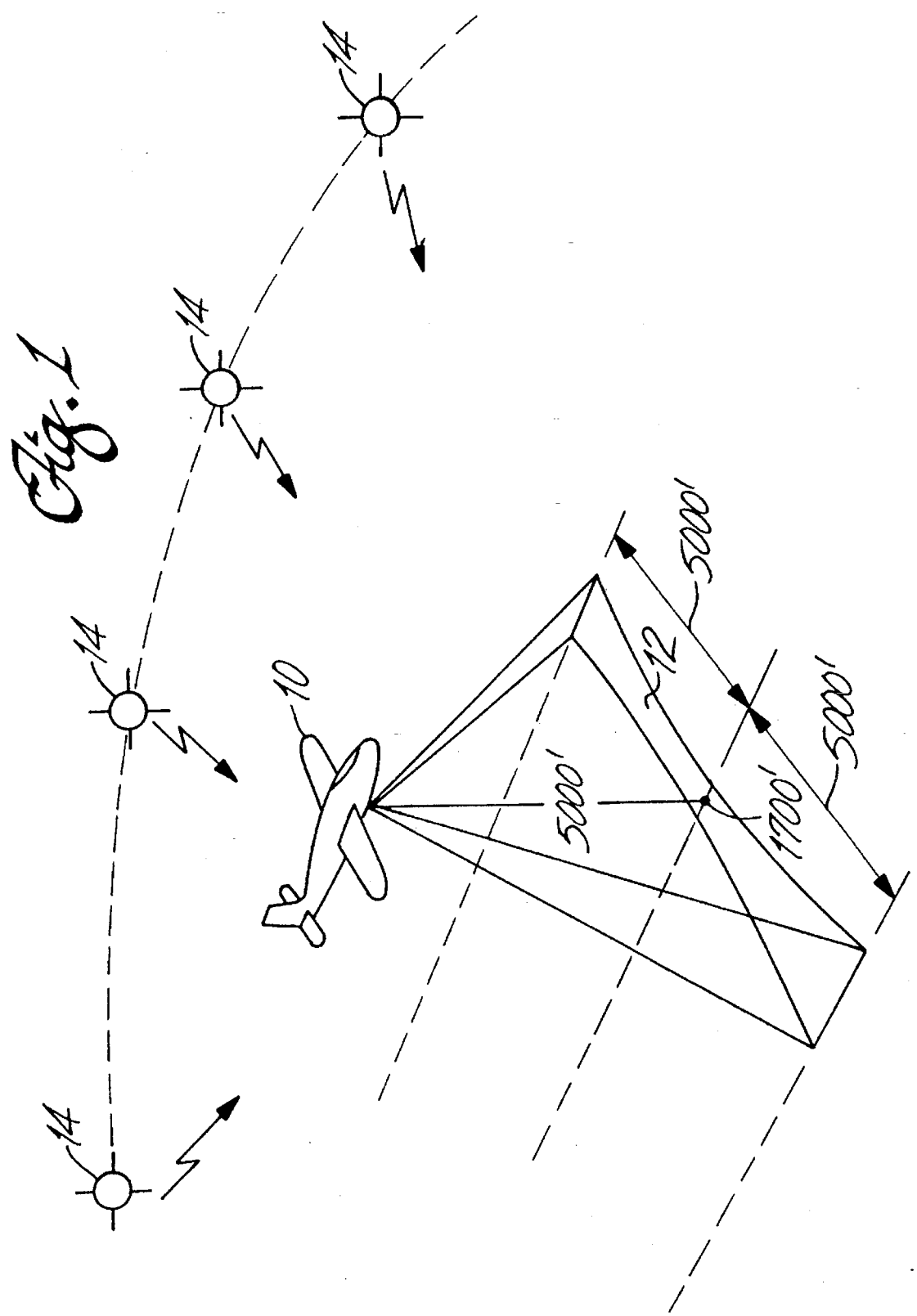
FIG. 1 is a schematic pictorial diagram of one embodiment of applicants' improved airborne direct digital panoramic camera.

Referring now to FIG. 1, there is schematically shown an improved direct digital airborne panoramic camera system and method in accordance with applicants' invention. As shown in FIG. 1, an aircraft 10, flying at an altitude of 5000 feet, would yield a bowtie photo frame 12 that is approximately 1774 feet long and 10,000 feet wide. As will be more fully described hereafter in connection with FIGS. 16 and 17, aircraft 10 incorporates as part of its navigation instruments a global position system (GPS) receiver, not shown, which receives navigational data from a series of orbiting satellites 14 which are part of the global positioning system which are well known to those skilled in the art of navigation.

The GPS navigation system permits the exact location of the aircraft in terms of latitude and longitude when a picture is taken and as will be hereinafter described to accurately determine and correlate the position of the sensor arm 16 of camera 18 shown in FIG. 3 in relationship to a fixed position on the earth.

In order to be commercially competitive, applicants' improved airborne direct digital panoramic camera system and method must be equivalent in performance to the currently available film systems. While comparison between film and electro-optical cannot be exact, set forth below in Table 1 is a set of performance parameters based on design and system tradeoffs.

TABLE 1

| Design Objectives | System Parameters |
| --- | --- |
| Image Quality at 5000 AGL | IIRS-7 @ Nadir ±5° |
| Velocity at 5000' | 300 Knots or less |
| Sun Angle | Local Noon ±2 hours |
| Modes of Operation | 10% and 55% Overlap |
| Sustainability | >1000 Frames of Data |

Figure 2:
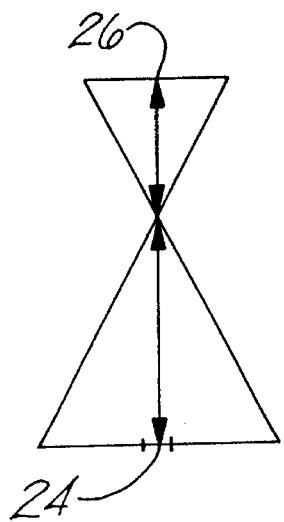
FIG. 2 is a geometric optical diagram illustrating pixel design dimensions of applicants' improved airborne panoramic camera system.

As illustrated schematically in FIG. 1, the above-listed parameters yield a bowtie photo frame 12 of approximately 1700 feet long and 10,000 feet wide for an aircraft flying at an altitude of 5000 feet at 300 knots or less. The number of picture elements (pixels) in a frame 12 can be calculated as:

$$\text{Pixels/Frame} = (\text{Frame Width/GSD}) \times (\text{Frame Length/GSD})$$

where GSD is the ground's sample distance as illustrated in FIG. 2. Image Quality (IQ)≧7 implies a GSD of no more than ⅓ of a foot. Therefore each frame of data will contain at least 153,000,000 pixels, 26. Thus the average data rate can be calculated as:

$$\text{Data Rate} = \text{Pixels P/Frame} \times \text{Frames P/Sec} \times \text{Bytes/Pixel}$$

Bytes/pixel is measured after compression and the frames per second is determined by the mission parameters. For a minimum set of requirements, 0.25 bytes/pixel will be stored and frames or pictures will be taken as often as every 2 seconds with 0.5 frames per second. This yields a minimum data rate of 15 megabytes per second.

Figure 3:
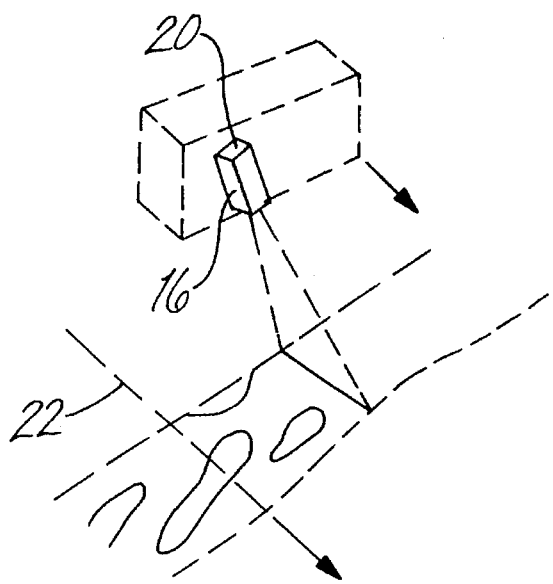
FIG. 3 is a partial block diagram of the preferred embodiment of applicants' improved airborne panoramic camera.

Turning now to FIG. 3 there is shown a partial breakout of an the airborne panoramic camera 18 having a rockably mounted sensor arm 16 which houses the lens and optical train, not shown. Mounted on top of the rockably mounted sensor arm 16 is an electro-optical assembly sensor 20. There are a number of commercially available airborne panoramic cameras, however in the preferred embodiment, applicants have utilized an optical system of an airborne panoramic camera built by Hycon and used by the U.S. military for several years. Panoramic cameras generally take pictures over a 90-degree angle and each frame represents a ±45 degree by a ±10 degree look at the ground. As the aircraft moves forward along a line of flight 22, the sensor arm 16 sweeps from starboard to port in about 0.5 seconds thereby transferring or generating the image signals to the electro-optical sensor. This mode of taking picture data in a cross flight line direction is commonly called a whisk broom technique.

As is known to those skilled in the photographic arts, airborne panoramic cameras, for example the KA-54A, KA-56A and KA-60 manufactured by Fairchild, the KA-55A manufactured by Hycon and the KA-80A manufactured by Itek, incorporate an image motion compensation (IMC) feature, not shown. The IMC virtually ensures that the picture is not blurred by aircraft movement because the forward motion of the aircraft in flight is removed or compensated for by the image compensation feature. In general, the image compensation feature moves the lens forward before initiating a picture-taking cycle and during the picture-taking period the lens moves aft as the aircraft moves forward thus compensating for the aircraft motion during frame exposure.

As is known to those skilled in the airborne panoramic camera arts, the relationship of the image compensation rate, aircraft velocity, aircraft height and aircraft velocity are important parameters in determining the pixel data rates.

The image compensation rate (IMC) may be expressed as:

$$IMC = Focal\ Length \times (Velocity/Height\ of\ Aircraft)$$

Referring again to FIG. 2, one of the most important parameters of the electro-optical sensor design is the determination of the appropriate ground sample distance (GSD) 24. As shown in FIG. 2, the ground sample distance 24 is simply how much ground each picture element (pixel) represents in a frame. The conversion of the GSD to pixel pitch (assuming for simplicity the pixel size for square pixels) may be stated by the following formula:

$$Pixel\ Pitch = Focal\ Length \times (Min\ GSD/Altitude)$$

Therefore in applicants' preferred embodiment, any sensor with a pitch less than 20 microns would produce an Image Quality (IQ) of 7 at an altitude of 5000 feet. In applicants' preferred embodiment, the pixel pitch of the sensor is 13 microns, which at an altitude of 5000 feet yields a GSD of 2.56 in. and 3.62 in. at nadir and ±45 degree look angle, respectively. This is equivalent to Image Quality 8.

With a pixel pitch of 13 microns the line rate can be calculated as:

$$Line\ Rate = (Cross\ Track\ Width/GSD)/Scan\ Time$$

The preferred embodiment of applicants' improved camera has a scan time as small as 0.5 seconds and therefore at an altitude of 5000 feet has a cross-track width of 10,000 feet. From the above equation it can be seen that this yields a line rate of 73,631 lines per second. Knowing the line rate permits the calculation of the pixels per port and the clock rate for the sensor from the following formula:

$$Max\ Pixels/Port = Clock\ Rate/Line\ Rate$$

Thus assuming a reasonable clock rate of 12.5 MHz, this would yield a maximum pixels per port of 170. This implies that the line array sensor is preferably segmented into sections of length of 170 pixels or less. In building applicants' improved camera, a number of design tradeoffs involving costs/service were made between scan time, clock rate and maximum pixels per port. In the preferred embodiment of applicants' improved camera, the scan time is in the order of 0.75 seconds, the clock rate is in the order of 12.5 MHz, and the maximum pixels per port were set at 256. These values yield a corresponding line rate of 49,100 lines per second. This slight slowing of the camera's scan time allows very useful tradeoffs and facilitates using less costly, commercially available sensors.

Figure 4:
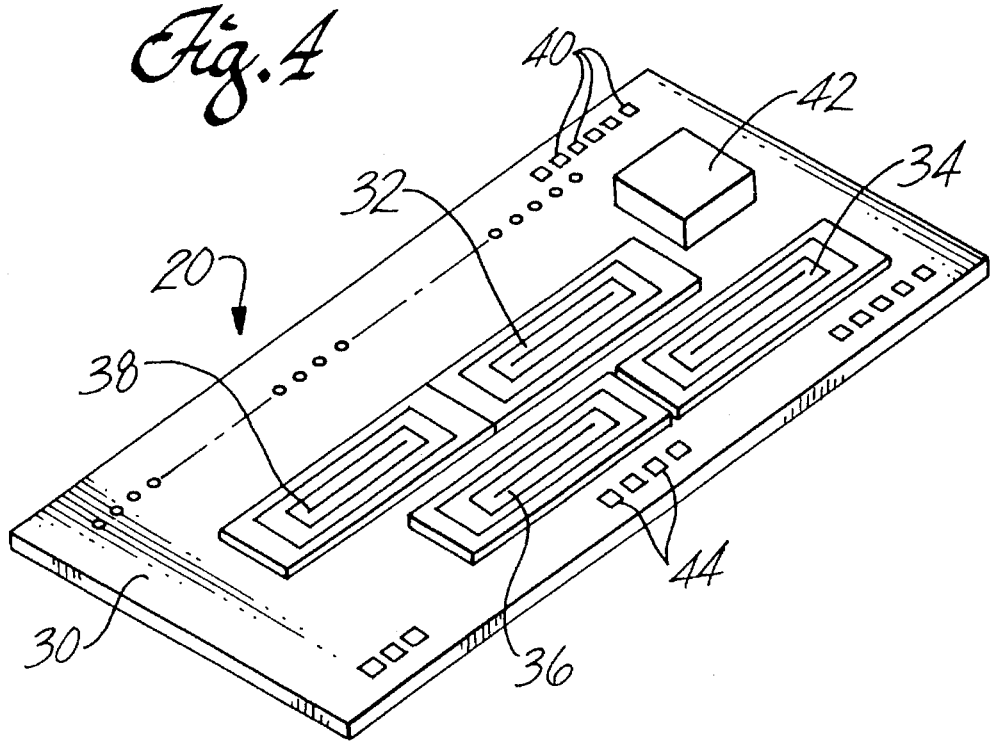
FIG. 4 is a perspective view of an electro-optical in-line imaging device usable in applicants' improved airborne panoramic camera system and method.

Referring now to FIG. 4, there is shown an electro-optical sensor assembly 20 which is designed to be mounted on the optical sensor arm 16 and become an integral part of the optical assembly, not shown. In this manner the electro-optical detector is fixedly mounted at the top of the optical path thus facilitating the maintaining of focus during flight operation. In prior art panoramic cameras, failing to keep the film flat and thus at a fixed distance from the lens was a major source of errors. Applicants, by fixedly mounting the sensor 20 to the arm 16 and thus with respect to the lens, eliminate a major source of so-called panoramic type errors.

The electro-optical sensor assembly comprises planer mounting board 30 which may be made of any insulating material, for example a glass epoxy type. Mounted on board 30 are four time-domain integration lined arrays 32, 34, 36 and 38. There are a number of commercially available TDI line arrays which are suitable for use, including the Dalsa 2048×96 sensor elements from Dalsa, Inc. in Waterloo, Ontario, Canada. The Dalsa 2048×96 sensor line array elements are a 13×13 micron pitch and can be operated at a 15 megahertz clock rate. An alternative TDI line array is commercially available from Loral Fairchild which includes a 1024×128 element with a 15×15 micron pixel pitch. Both the Dalsa and the Loral arrays are front side illuminated charge coupled (CCD) devices and imaging is accomplished by integrating photons which must pass through one of more levels of polysilicone. Thus the resulting image is heavily filtered in the blue and green response of those imagers. The plain sensor array assembly 20 further includes a plurality of power and control connections 40, a digital timing and control processor 42, and thirty-two channel video preamplifiers 44. Preamplifiers 44 on the sensor array assembly perform the first step of video signal conditioning and may be any of the commercially available preamplifiers used, for example an emitter follower circuit MMBT 3904, manufactured by Motorola. As shown in FIG. 4 the electro-optical sensor assembly 30 preferably includes the sensors 32, 34, 36 and 38, drive electronics 42 and preamplifiers 44 to precondition the image signals. The minimal inter-array spacing is desirable because it facilitates the use of relatively short interconnecting wires, thus facilitating impedance matching of the CCD clocking signals which helps in maintaining the low signal-to-noise ratio required when dealing with low-level signals and the short integration times, as will be discussed hereinafter.

Design of the sensor assembly 30 is in a large measure dictated by the active picture area of the airborne camera. Airborne panoramic cameras generally have an active picture area of 4 inches, and therefore an ideal sensor array would use a 4-inch line array with something in the order of 2000 pixels per inch. While an in-line array on the order of 4 inches is certainly commercially feasible, the actual design of applicants' improved sensor array is a tradeoff utilizing cost, number of ports and clock speed as the primary determinants. In the preferred embodiment of applicants' improved electro-optical sensor, 4 Dalsa 2048×96 element TDI line arrays 32, 34, 36 and 38 are utilized as shown which gives an active optical area of four inches. Obviously for other applications a single one-inch line array, or alternatively up to seven or eight line arrays in straight line or staggered parallel lines, could be utilized for different applications, as will be understood by those skilled in the photographic and airborne reconnaissance arts.

It should be understood that the one-inch line array sensor will result in a substantially less resolution or picture quality and the seven or eight-inch sensor would be comparable to a framing camera operation which could be utilized for mapping.

Figure 18:
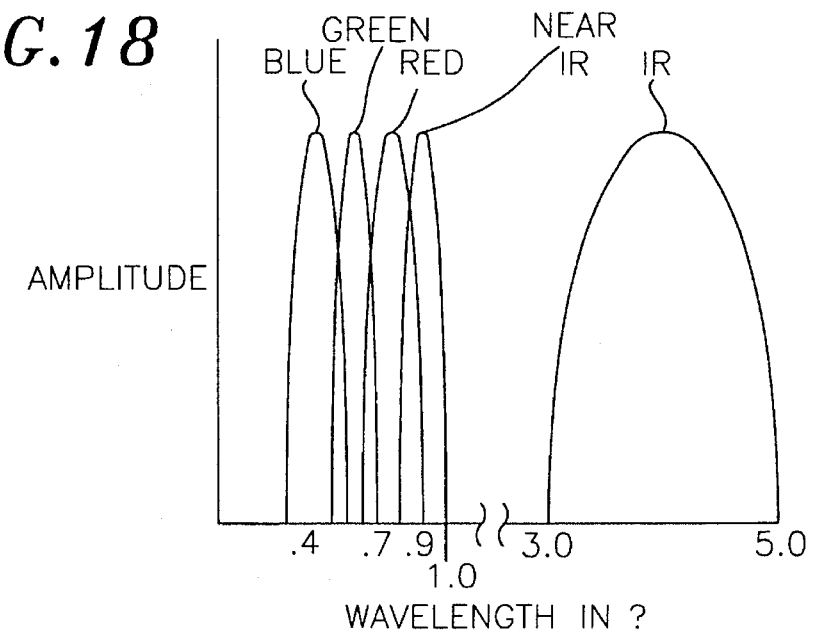
FIG. 18 is a graph of a portion of the electromagnetic spectrum illustrating remote multi-spectral data utilizable in accordance with another aspect of applicants' improved airborne digital panoramic camera.

In another embodiment of applicants' improved airborne panoramic digital camera and method, the electro-optical sensor 30 or one or more of the line arrays 32, 34, 36 or 38 of FIG. 4 or line arrays illustrated in other embodiments may be replaced by or supplemented with an additional infrared sensor for various applications. The structure and function of commercially available infrared sensors, for example HgCdTe (Mercury Cadmium Telluride) are well known to those skilled in the remote sensing arts. By utilizing various sensors, detectors or filters alone or in combination facilitates remote sensing of radiation from 0.3 microns wavelength up to about 14 microns wavelength. In general, multi-spectral imagery data is collected in several discrete bands, as illustrated in FIG. 18, to obtain good quality data.

Figure 5:
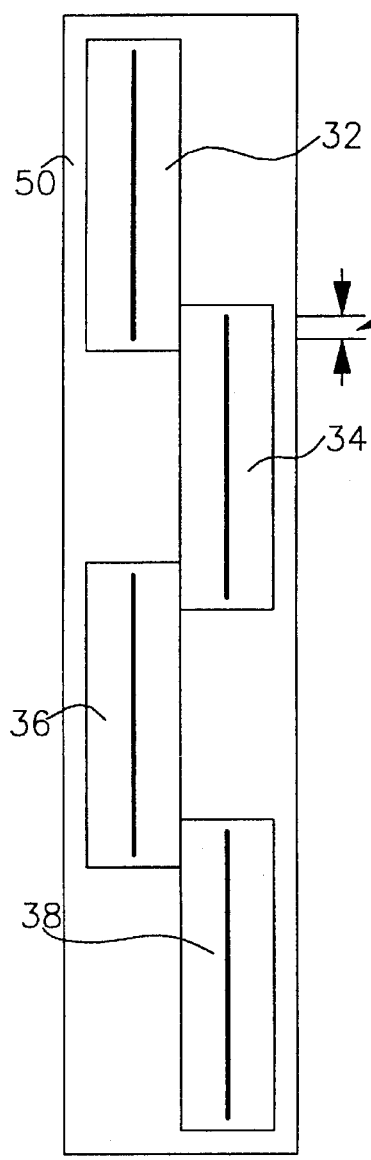
FIG. 5 is a top view of an improved in-line electro-optical sensor in accordance with another aspect of applicants' invention.

Referring now to FIG. 5, sensor line array overlap, as illustrated in FIGS. 4 and 5, will be described. Four electro-optical sensors, for example of the Dalsa type each comprising a 2048×96 element TDI line array are mounted on a glass member substrate 50 which is, for example 1.5 inches long by 0.5 inches wide. The pixel line array length of the illustrated Dalsa sensor is one inch with in the order of 2000 pixels per inch. The overlap 52 as shown in FIG. 5 is necessary in order to avoid gaps in picture line data which if uncorrected would be a major source of error in the picture data. The optical sensor 20 moves as the optical column scans the ground scene for each frame. If a single line of pixel elements were employed, this movement would not present any optical difficulties in the resulting picture data. However with the use of Timed Domain Integration (TDI), it is critical that the line arrays be oriented perpendicularly to the travel of the camera scan. As is known to those skilled in the art of airborne photography, this can be accomplished through the appropriate positioning of the fixtures and the use of optical correction mechanism, to be more fully explained hereinafter. In applicants' improved airborne digital panoramic camera a new picture (frame) is taken every 1/75 of a second. With 2000 pixels per sensor element and four sensor elements there are thus 320 million pixel signals per second generated by the operation of the airborne camera as may be calculated utilizing the aforesaid equation for data rate as a function of the number of pixels per frame times the number of frames per second multiplied by the bytes per pixel having a minimum of 0.25 for the defined system requirements. The analog video signals are read from the sensor array 30, as will hereinafter more fully be described, via four sets of 8-channel graphic data outputs 44 from each Dalsa sensor line array at an effective clock speed of 28 megahertz. A new picture scan is initiated every 2.25 seconds. As shown in FIG. 5 there is a pixel line seam separation 52 of approximately ¾-inch, which for the Dalsa line array is equal to approximately 1500 pixel widths. There is also a sensor line overlap of approximately one millimeter creating duplicate pixel data on both sides of the seam 52. The seam separation is a potential error source which requires control of the scan arm velocity VO to within 0.1%. As will be hereinafter discussed in connection with FIG. 11 the post processing of the seam data uses the overlap data to calibrate the actual velocity of the scan arm. The post processing uses a Fourier type analysis in two dimensions to calculate the actual velocity errors which can be used to compensate or correct the graphic or picture data.

Figure 6A:
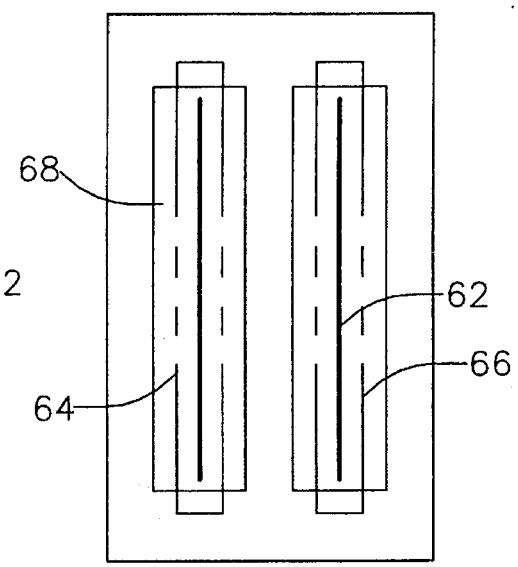
FIG. 6A is a top view of an alternate embodiment of an improved in-line electro-optical sensor utilizable in applicants' improved airborne digital panoramic camera.
Figure 6B:
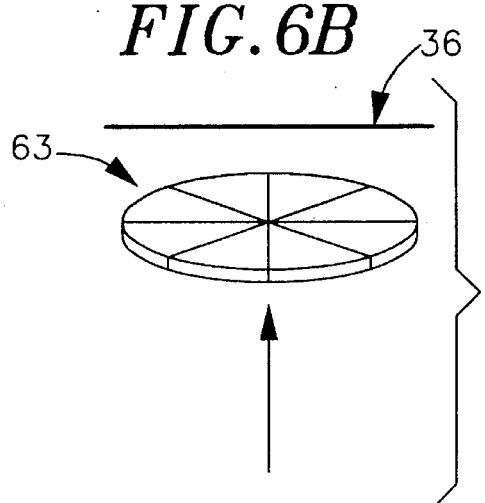
FIG. 6B is a perspective view of another alternate embodiment of an electro-optical sensor utilizable in applicants' improved digital panoramic camera system and method.

Referring now to FIG. 6, an alternate embodiment of applicants' improved electro-optical line sensor array 60 is shown which is particularly useful in multi-spectral imagery of agricultural crops. For years the U.S. Agriculture Department has undertaken a number of research projects to explore the feasibility of developing improved remote multi-spectral sensing to identify and quantify various ground conditions which would be useful in improving land use. Remote spectral sensing in agriculture is concerned with a determination of various parameters and characteristics of crops through an analysis of data taken at a distance. Remote multi-spectral sensing in agriculture has the broad objective to increase the yield and quality of agricultural cultivation and decrease losses in production which are due to disease or weed or insect infestation thereby increasing the quantity and quality of agricultural production. As will be hereinafter more fully described, certain portions of the electromagnetic spectrum are particularly useful in agricultural multi-spectral imaging. A biological mass or other properties of certain vegetation can be estimated as a ratio of the infrared to the green-yellow spectrum. An improved electro-optical line sensor assembly 60 illustrated in FIGS. 6A and 6B would be useful in such agricultural remote multi-spectral imagery of crops. As shown in FIG. 6A, there are two electro-optical line arrays 62 and 64 which are overlaid by color filters 66 and 68. As hereinabove described, the color filter on sensor 62 may comprise an infrared filter while the filter on array 64 might be a green/yellow filter thus yielding the picture data useful in determining the biomass of certain crops overflown by a plane equipped with a detector similar to that in FIG. 6A. Alternatively, as illustrated in FIG. 6B, a single sensor 36 could be utilized in conjunction with a color wheel 63 which when rotated would generate output data taken through the respective filter segments 65. Electro-optical sensors have dynamic ranges which are greater than that offered by film and therefore applicants' improved electro-optical sensor has a spectral response which offers distinct advantages in such applications as crop surveys and operating under hazy or less than ideal conditions.

Figure 7:
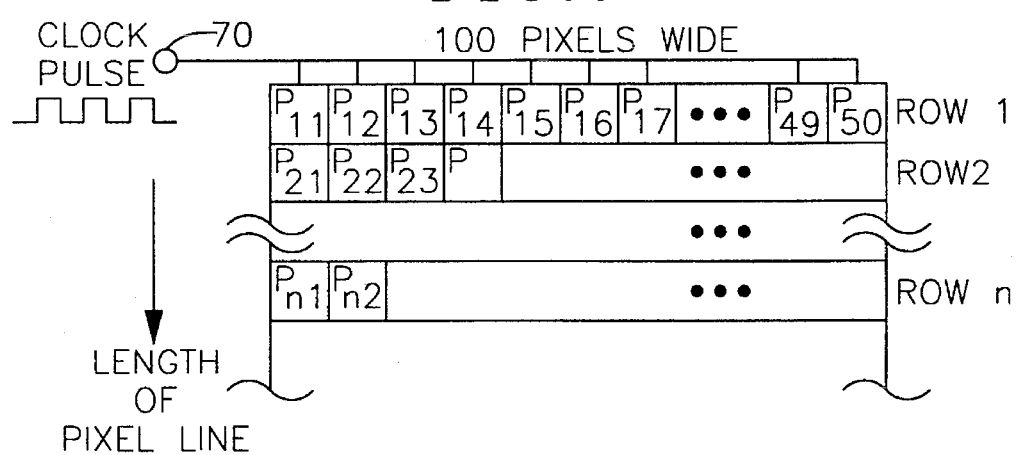
FIG. 7 is a pictorial representation of a portion of the improved in-line pixel array of applicants' electro-optical sensor utilizable in accordance with applicants' improved digital panoramic camera and method.

Prior art film-based panoramic cameras have shutters which are set by an automatic exposure control system with shutter speeds of between 1/100 to 1/3000 of a second being selectable. If a single electro-optical line array were utilized, the corresponding shutter speed for the modified prior art camera would be 1/49,100 second which would be too fast to obtain reasonable signal-to-noise ratios in the video data. Therefore in applicants' preferred embodiment the effective shutter speed is lowered through the use of time domain integration (TDI). As is known to those skilled in the electro-optical sensor arts, commercially available electro-optical line scanners, such as those referred to above by Dalsa and Loral Fairchild, utilize TDI to lower the effective shutter speed. In FIG. 7 the length of the pixel line is divided into 2000 rows with each row containing 100 pixels. In operation the charge from pixel 1 of row 1 ($P_{11}$) is clocked or transferred to pixel 2 of row 1, i.e. the adjacent pixel ($P_{12}$). The velocity of the scan arm V with 100 stages (i.e. pixels in each row) is thus V±1%. Thus the incoherent integration accomplished by the TDI effectively increases the exposure time in this example by a factor of 100, thus increasing the dynamic range of the sensor and compensating for variations of the individual pixel output. For a complete understanding of the TDI incorporated in the Dalsa sensor, reference may be had to the Dalsa technical literature for the electro-optical sensors available from Dalsa, Inc., Waterloo, Ontario, Canada.

As shown in FIG. 7, a source of clock pulses is connected to terminal 70 and at successive clock times the accumulated charge for example from the first pixel, $P_{11}$ is clocked or transferred to the adjacent pixel $P_{12}$. Thus with the illustrative hundred stages of TDI, the incoherent integration effectively increases exposure time by a factor of 100 thus increasing the dynamic range of the sensor and compensating for any variations in the individual pixel outputs. As is known to those skilled in the electro-optical sensor art, commercially available scanners commonly utilize a TDI type principle to achieve these desirable features.

Figure 8:
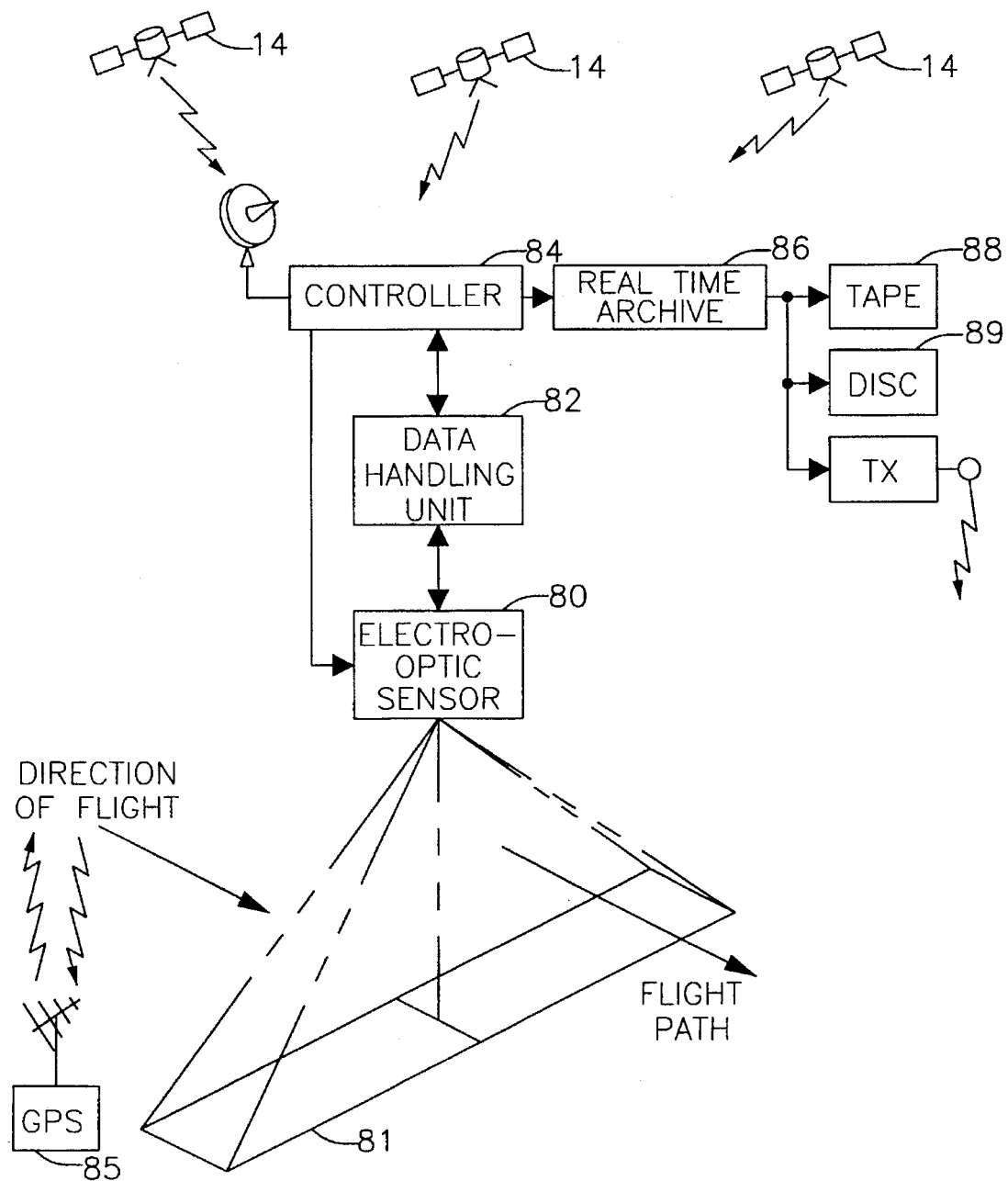
FIG. 8 is a logic block diagram illustrating principal system components of applicants' improved airborne digital panoramic camera system and method.

Referring now to FIG. 8, there is shown a logic block diagram of the applicants' improved airborne digital panoramic system and method. As illustrated in FIG. 8 applicants' improved system and method includes four major components: an electro-optical sensor 80 which as shown generates a bowtie photo frame approximately 1700 feet long and 10,000 feet wide at an aircraft altitude of 5000 feet (above ground length AGL), a data handling unit 82 which calibrates the electro-optical sensor and digitizes, compresses and stores the video data in a high speed buffer memory, a controller unit 84 which includes a computer to control the overall calibration and operation of the system and real time archive unit 86.

The data handling requirements for applicants' improved airborne direct digital panoramic camera and method are quite high. The output of the camera is more than 450 megapixels per second. Utilizing a ten-bit analog-to-digital converter, as will hereinafter be described, the data rate increases to over 550 megabytes per second. To put this number into perspective, a single page of printed text is in the order of 10,000 characters or bytes of data. Applicants' improved camera thus can be viewed as creating the equivalent of over 40,000 pages of printed text every second. Applicants challenge in designing their improved airborne digital panoramic camera and method was to deal with this very high data rate in a cost effective, commercially competitive manner which meant that the data rate had to be substantially reduced through the system in order to be compatible with current commercially available recorders having up to 32 megabytes per second inputs, as will hereinafter be more fully described in connection with FIG. 11. Applicants preferred system embodiment employs a number of data rate reduction schemes to effectively reduce the camera data rate of over 550 megabytes per second peak to the data rate in the order of 32 megabytes per second which can be handled by current state-of-the-art commercially available data recorders. The first major data reduction process involves utilization of the camera's duty cycle. Although each frame of data is taken in about 0.75 seconds, pictures normally will not be taken any more often than every 2 seconds. Thus by employing applicants' leveling buffer, the graphic data after being digitized is stored in the buffer at the 0.75 second rate and read out every 2 seconds thus yielding a 2.85:1 reduction in the data rate. The next step to achieve reduced data rates is to employ data compression techniques. As is known to those skilled in the data handling arts, there are a number of commercially available compression circuits for digital signals. For example, the Joint Photographic Experts Group (JPEG) compression circuits are available which yield compression ratios in the order of 5:1 in the data rate. Thus data compression would yield in the case of applicants' preferred design that there would be 2 bits per pixel after compression as opposed to the original 10 bits per pixel. An additional reduction in the data rate is accomplished by utilizing a process of calibrating the individual pixels. As will hereinafter be described, a look-up table is utilized to map the sample values from each individual pixel into a corrected value utilizing a log conversion. This is similar to the gamma correction sometimes utilized with film. As is known to those skilled in the panoramic arts, the calibration of the output of individual pixels in each line is required either during the collection of the data or in the post-collection processing procedure. Without the individual calibration of the pixels, lines generally would appear in the imaging making the pictures very streaked or bandy. These lines would also appear as data features to the compression algorithm which would have to work very hard to keep them in the picture. Therefore by calibrating the pixels before compression, there is an additional advantage that the compression function will be more effective and further reduce the data stream rate. In the preferred embodiment of applicants' improved airborne panoramic camera, the JPEG algorithm is employed in the data compression function. A set of JPEG data compression chips are commercially available from LSI Logic, Inc. (L64735 QC-35 Discrete Cosine Transfer and L64745 QC-30 JPEG Compression). In the data reduction processes as described above, the composite reduction is in the order of 14:1 and thus the output of the data handling unit may be recorded on commercially available magnetic tape or disk. As will be hereinafter more fully described, the data handling unit comprises a data processing unit, for example of the Intel 486/66, with appropriate software programs to provide setup, maintenance and overall operation control. The two major modes of the data processing unit are (a) single frame, where a single frame of data is taken and displayed on a local monitor, and (b) operation where multiple sequential frames of data are taken continuously and stored on magnetic tape, e.g. tape unit 88 or disk 89. The real time archive unit receives digital data from the data handling unit at rates up to 32 megabytes per second. The unit, for example, TSC/STX Interface manufactured by Tri-Plex Systems, Inc. Tape and disk units 88 and 89 respectively may be of any type commercially available, for example, the Sony Dir 1000 Tape unit which employs the standard D-1 tape in which the tape cassette stores approximately 100 gigabytes of data which in applicants' improved camera would be more than 1000 frames of data or an IBM 3350 type disk unit.

Figure 9:
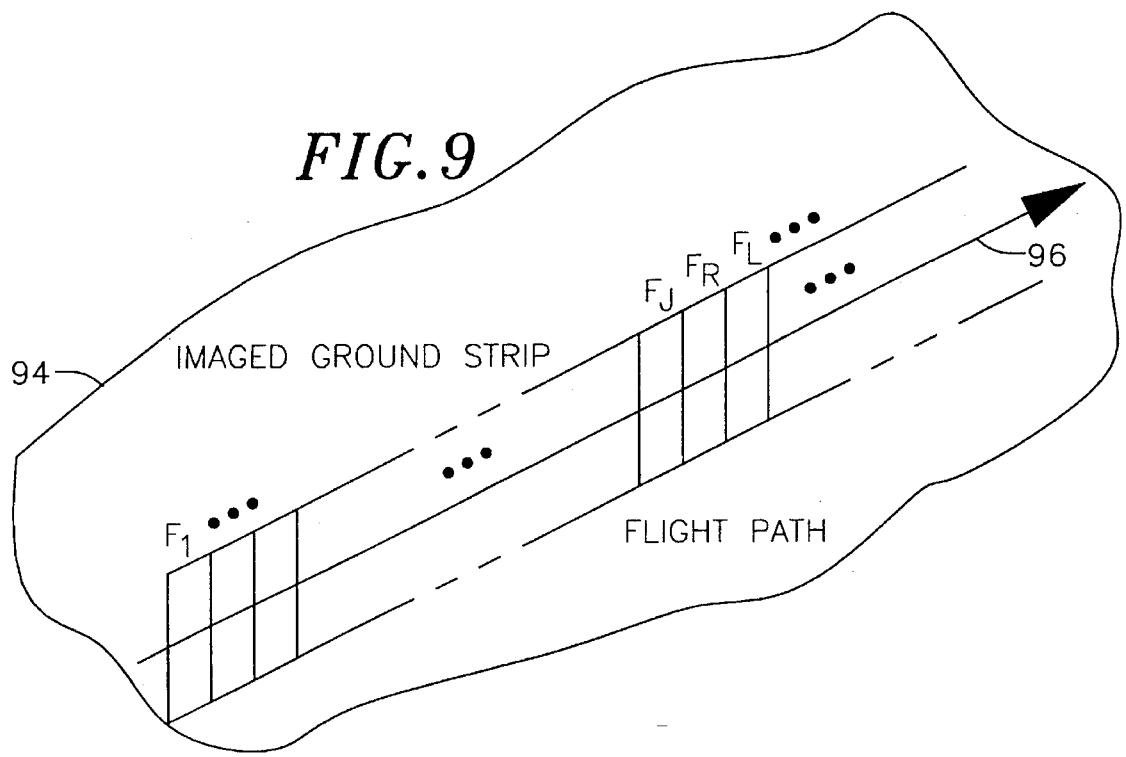
FIG. 9 is a partial pictorial illustrating the picture or frame relationship generated in the operation of applicants' improved airborne digital panoramic camera system and method.

Turning now to FIG. 9, there is shown a pictorial representation of a portion of an imaged ground strip 94 on which the path of flight 96 is indicated by an arrow. The sequential bowtie shaped photo frames are shown along the flight path and numbered $F_1$ through $F_R$ which as hereinabove described are taken, for example, every two seconds during normal reconnaissance flight operations. As described in connection with FIGS. 1 and 8, a GPS receiver in conjunction with other normal navigation instrumentation, not shown, can give the exact latitude and longitude for the start, beginning or center of each frame in relationship to the GPS coordinate system. As is known to those skilled in the mapping and surveying arts, the U.S. National Geodetic Survey data sheets describe the location of known or fixed survey points and such data can be used to reference the aircraft data to such fixed points on the earth.

As described above in connection with FIGS. 1 and 8, the data stream out of the camera is in the order of 450 megapixels per second. The utilizing a 10-bit analog-to-digital converter magnifies the digitized data stream to more than 550 megabytes per second, which is roughly equivalent to over 40,000 pages of printed text every second. Panoramic cameras generally have the ability to collect massive amounts of data in a relatively short time. For example, at IQ-7 the KA-55 in one hour can collect imagery data covering over 500 square miles and generate more than 87 gigabytes of imagery data. This is equivalent roughly to 87,000 three and one-half inch floppy disks. As is known to those skilled in the computer and data processing arts, inputting massive amounts of data into a computer system is a time-consuming and basically inefficient process. In addition, the massive data stream of applicants' improved airborne digital panoramic camera system and method is compressed using for example the JPEG chip set. As is known to those skilled in the arts, in order to utilize compressed data it must be decompressed, that is in effect run through the decompress chip set or similar software routine to restore its original noncompressed state. Since the information from applicants' improved airborne digital camera and system will go in the ordinary course to multiple users, it is desirable that convenient data address systems be developed to permit the user to access the exact portion of the data which is relevant to their particular current needs.

As will be fully explained hereinafter in connection with FIGS. 11 and 17, knowing where the sensor arm is pointing in terms of exact latitude and longitude coordinates is important in accordance with another aspect of applicants' invention, basically by using the differential GPS data to pinpoint the exact position of the aircraft GPS antenna to ±1 centimeter. This can be utilized to correct errors and to simplify addressing specific portions of the imagery data.

Figure 10:
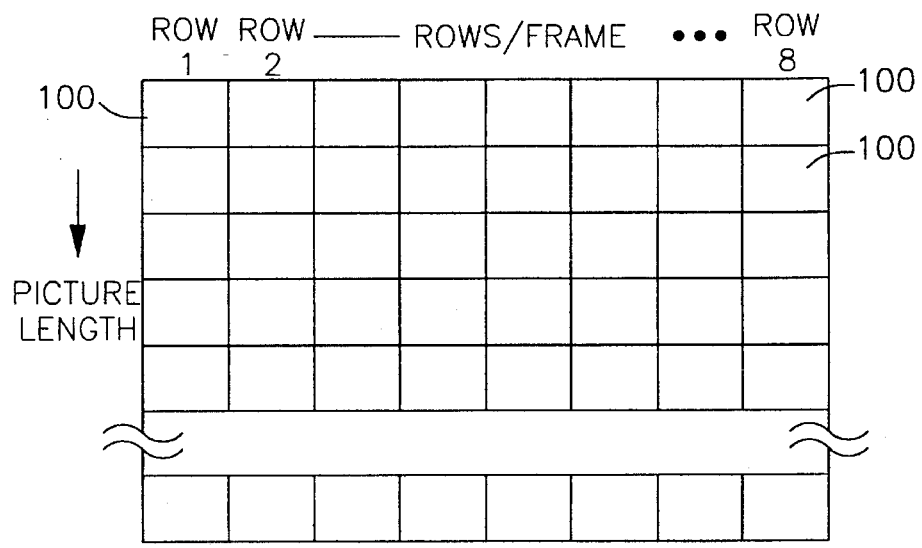
FIG. 10 is an expanded pictorial diagram of the multiple frame interrelationship of the video data generated in accordance with applicants' improved airborne panoramic camera and method.

Referring now to FIG. 10, there is shown a pictorial representation of the rows and columns which make up a picture width and length respectively. As hereinabove described, each of the eight row segments, row 1, row 2 . . . row 8, includes the data from 64,000 pixels divided into eight 8 by 1000 sub-blocks. Each picture has up to 4000 rows and therefore 32,000 sub-blocks, 100 are illustrated in FIG. 10. It would be possible to address the image digital data segments 100 by a standard row column address scheme as is well known to those skilled in the computer memory arts. However in applicants' improved airborne panoramic camera and system, it is possible to address a sub-block 100 by its geo-reference, i.e. the latitude and longitude coordinates determined at the beginning, edge or center of a frame. As will hereinafter be described in detail in connection with FIGS. 11 and 16, geo-reference of sub-blocks of data by latitude-longitude coordinate data will permit the user of applicants' camera and method to access, decompress and load into the computer system only those sub-blocks as small as 8000 pixel bytes, desired and then expand from there rather than loading an entire data base and accessing it in a more conventional and less efficient manner.

Thus in accordance with another aspect of applicants' invention, the sub-blocks 100 may be individually addressed in the compressed data by specifying the latitude-longitude coordinate data at the beginning of the frame and designating which of the eight sub-blocks are of interest.

Figure 11:
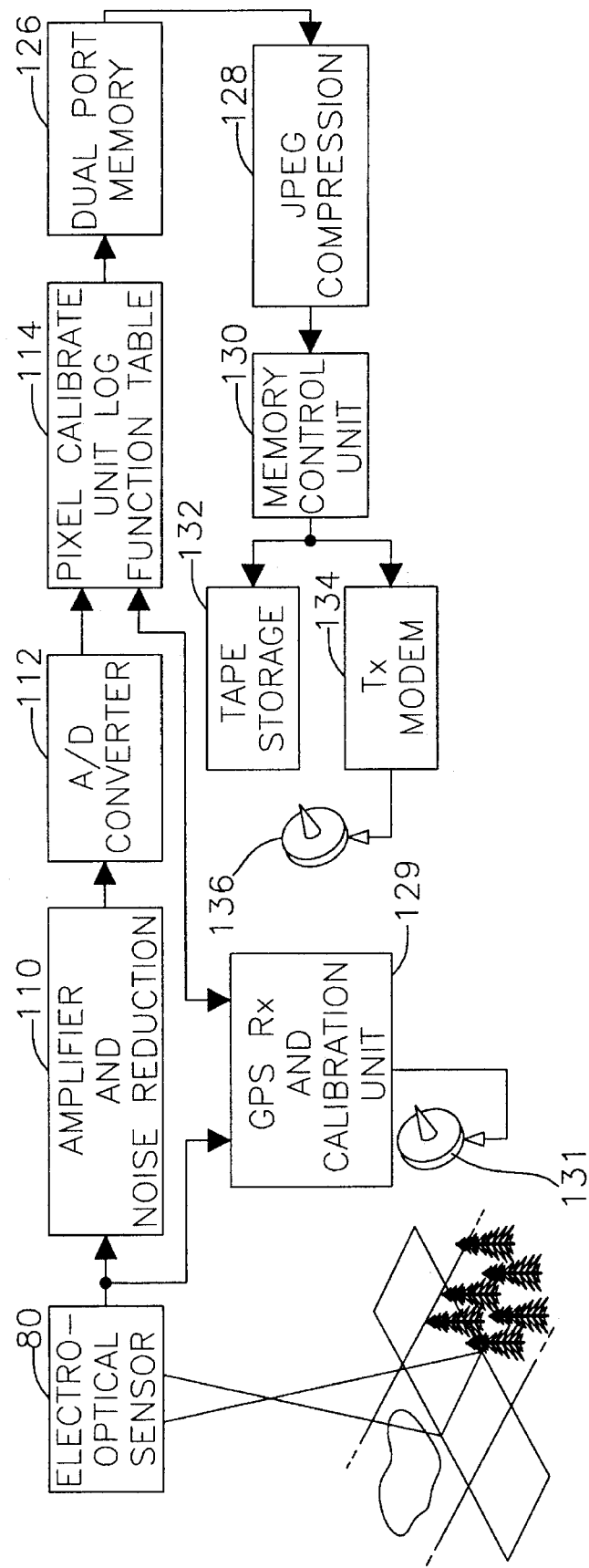
FIG. 11 is a logic block diagram illustrating the overall system operation of applicants' improved airborne direct digital panoramic camera and method.
Figure 14A:
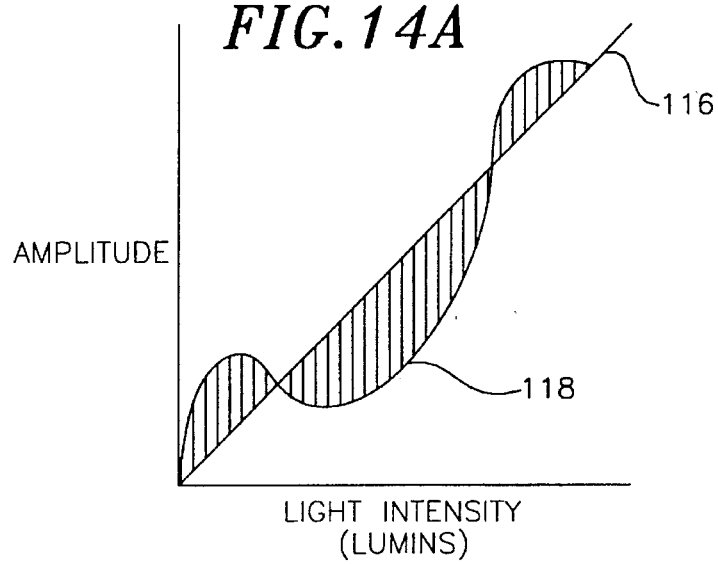
FIGS. 14A and 14B are graphs illustrating pixel calibration data utilizable in accordance with another aspect of applicants' invention.
Figure 14B:
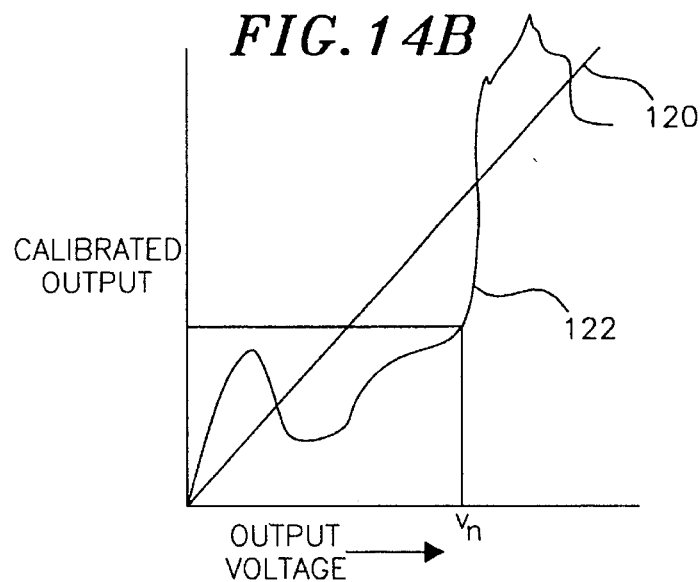

Referring now to FIG. 11, there is shown an overall logic block diagram of applicants' improved airborne digital panoramic system and method. The electro-optical sensor 80, as hereinabove described, is a four inch electro-optical line sensor with a 13 micron pixel size and 96 stage time domain integration. The analog signal from the electro-optical sensor 80 is pretreated in parallel channels from the sensor to amplifier 110 where the analog signals are amplified and subjected to a correlated double sampling. The correlated double sampling requires two sample-and-hold circuits and a subtracting amplifier, not shown, which is available as an integrated circuit from Kodak as product number KASP-120. During each clock period, one of the sample-and-hold circuits is loaded with the "noisy zero" value of the line array, while the other sample-and-hold circuit is loaded with the pixel value plus "noisy zero." Through analog subtraction the "noisy zero" value which represents the most significant noise source in the CCD array output signal is eliminated. The resulting signal is then amplified and fed to a standard analog-to-digital converter 112 such as Analog Devices product number AD 773. The output of the A/D converter, which may be of any of the well-known commercially available types capable of operating at clock rate of 15 megahertz, is fed to the pixel calibration unit and log function unit 114. The pixel calibration unit 114 comprises a lookup table which maps the sample values for each pixel into a corrected or normalized value. FIGS. 14A and B illustrate a pixel calibration curve where 116 is the desired linear relationship between light intensity expressed in lumens and the amplitude of the pixel analog signal. The actual output curve for each pixel is designated 118 with the crosshatched area representing the differential plus or minus deviation from the linear desired relationship. This data is developed using a standard light source and measuring the signal output amplitude of each pixel. FIG. 14B shows the output of the calibration log unit in a digital eight-bit value with the desired linear relationship being indicated in a curve 120 and the dynamic response indicated as 122. After each pixel in the electro-optical array has been statically calibrated, the values and log function are loaded into the pixel calibration unit which in turn provides data for the calibration unit 114. As will hereinafter be more fully modified in flight, preferably with the input of picture data taken during the flight so that the pixel calibration unit can be dynamically altered to correspond to the actual mission conditions.

Figure 13:
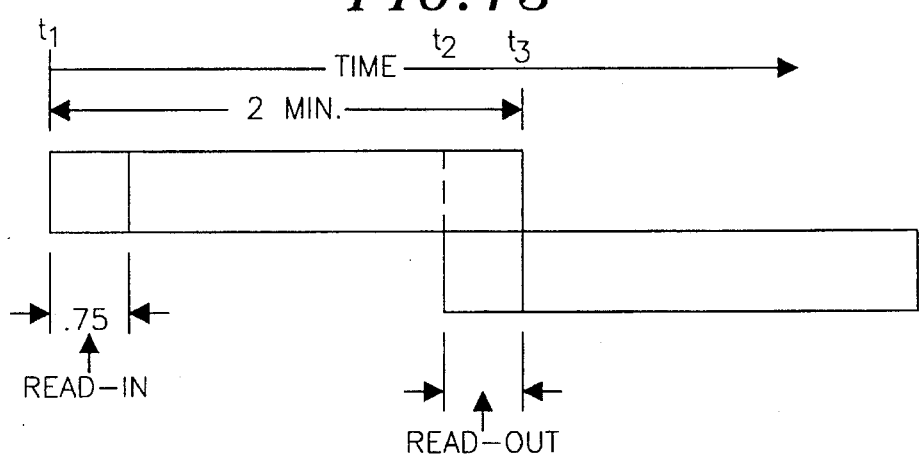
FIG. 13 is a schematic logic diagram illustrating the overlap operation of a dual port memory utilizable in accordance with principles of applicants' improved airborne digital panoramic camera and system.

The output of the A/D converter 112 is at a data rate of 3.28 gigabits per second and with the 10:8 log function conversion table 114, the output of the pixel calibration unit is at a data rate of 2.624 gigabits per second which is inputted into the dual port memory 126. The first major data rate reduction occurs by taking advantage of the camera's duty cycle with each frame of data being taken in about 0.75 seconds with pictures being taken on the order of every 2 seconds. By using a leveling dual port memory which may comprise any semiconductor memory system having dual, separately clocked input and output ports, data are stored in a buffer at the 0.75 second rate and read out at the 2 second rate, thereby yielding a 2.85:1 reduction in data rate. Operation of the dual port leveling memory is shown in FIG. 13 with the data read in occurring at $t_0$, i.e. the beginning of the initial 2-minute interval. The subsequent frame data is read in 1.25 sec. later at $t_1$ and the initial data is read out at $t_2$ which is 2 min. after it was read in to the leveling memory 126. The output of the dual port memory 126 is inputted into the JPEG compression circuit 128. There are a number of commercially available data compression chip sets which could be employed in applicants' improved airborne digital panoramic camera, however in the preferred embodiment applicants employ the JPEG chip set of integrated circuits from LSI Logic Inc. The LSI Logic integrated circuit chip set was selected because of its very high implementation speed and high image quality with respect to compression ratio. The output of the JPEG compression circuit 128 is fed to memory control unit 130. With the 5:1 reduction in the data rate out of the JPEG compression circuit, the input to the memory control unit is at a rate of 123 megabytes per second. The memory control unit takes the compressed data and formats it for the output devices. In the preferred embodiment, memory control unit 130 comprises an 8-bit ECL interface to the TRI-Plex interface. The output of the memory control unit may be selectively directed to tape storage unit 132 or transmitter modem 134. The function of the memory control unit is to record all camera data on removable memory without adversely affecting the mission planning, e.g. record in real time. To accomplish this, the key parameters are the maximum data rate and data storage capacity of the memory control unit 130 and tape storage units 132. A number of tape storage units are compatible with the peak and average data rates encountered in applicants' improved airborne digital panoramic camera system and method. For a typical mission taking pictures every 4 seconds and where 10% of the mission time is taken in executing turns, the peak data rate of 32 megabytes per second would equate to an average mission data rate of 14.4 megabytes per second. One such commercially available high speed tape storage unit is available from General Electric in its family of high performance 19 millimeter Rotary Digital Recorders which include both ground and airborne units. Alternatively, the data from applicants' improved airborne panoramic camera may be directed from the memory control unit 130 to a transmitter modem 134. Several design options are available for transmitting the video data via antenna 136 to a ground station, not shown. For example, the data representing a single frame or a few frames of data could be segregated in the memory control unit 130 and, for example, reduced from the order of 64 megabytes to the order of 2 megabytes of data. This compressed data stream file could then be transmitted over a standard 54 kilobaud transmitter in the order of 6 minutes which is consistent with worldwide low-cost satellite communications systems.

In accordance with another aspect of applicants' invention, data from global position system satellites 14 (FIGS. 1 and 8) is utilized to compensate for panoramic or pointing errors in the imagery data which result from the sensor arm 16 (FIG. 3) not being normal to the ground due to motion of the aircraft 10. As shown in FIG. 11, a GPS Receiver and Calibration unit 129 receives signals from a plurality of global position system satellites 14. Antenna 131 is mounted on plane 10 and thus through the GPS Receiver 129 computes the latitude-longitude coordinates of the GPS antenna 131, and thus the exact position coordinates of the pixel array can be calculated as hereinafter more fully described in conjunction with FIGS. 8, 11 and 17 utilizing differential GPS techniques. As hereinafter will be described in connection with FIG. 17, the dynamic calibration apparatus and method may comprise a plurality of airborne GPS receivers in combination with an inertial guidance system to accurately determine the attitude of the sensor arm relative to motion induced by roll, pitch or yaw movements. The dynamic calibration setup table data is calculated using mission setup data from the sensor 80, and static pixel calibration data is utilized to update the Pixel Calibration Unit 114 during mission setup procedures.

Figure 12:
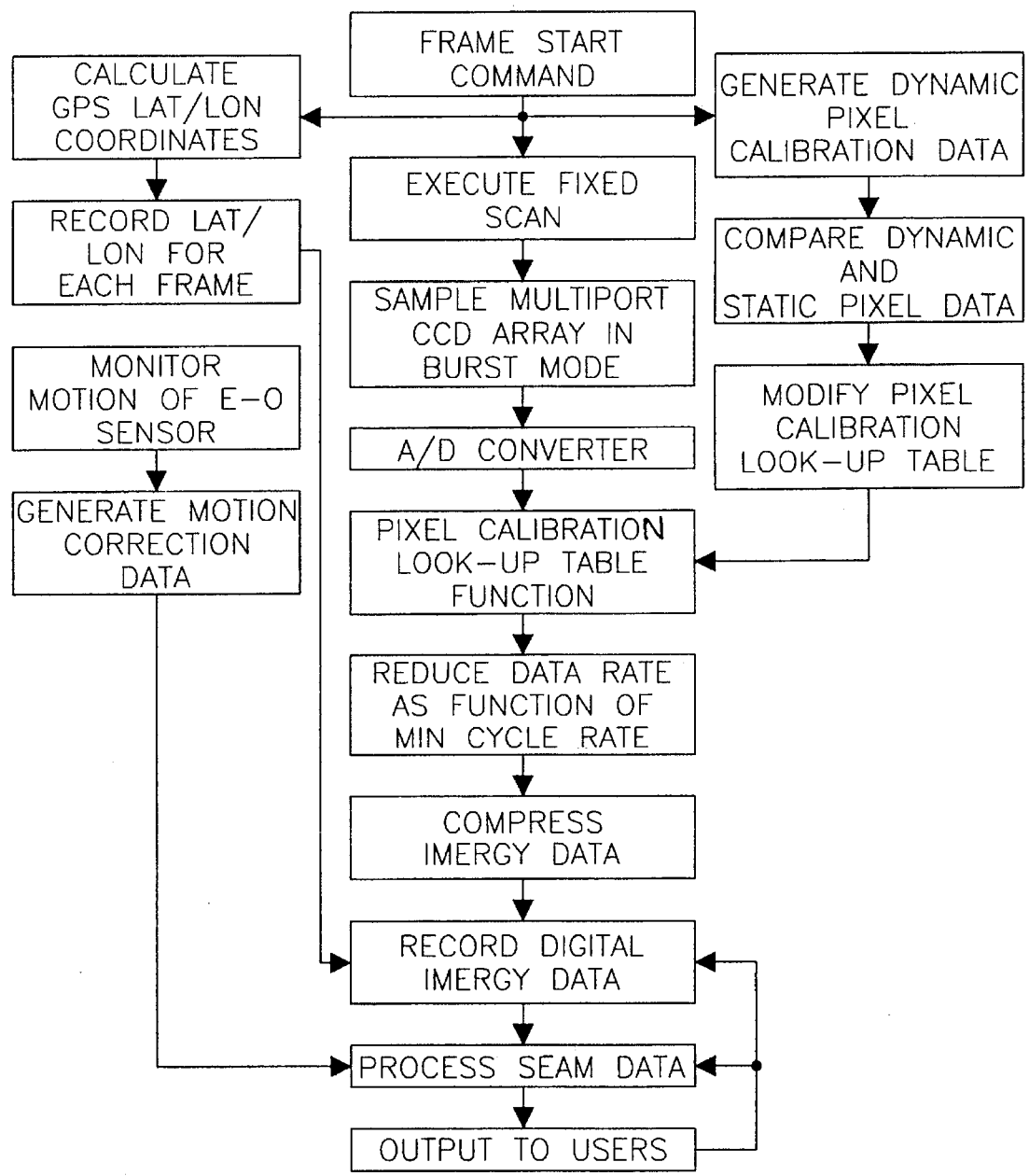
FIG. 12 is a logic flow diagram illustrating another embodiment of applicants' improved airborne digital panoramic camera and process.

Referring now to FIG. 12, there is shown a logic flow diagram of applicants' improved digital panoramic camera and method. Before operation is initiated by a frame start command, initial camera calibration and test maintenance and setup procedures, not shown, are accomplished. In the camera calibration process various lookup tables are loaded with appropriate values in accordance with the mission data, e.g. anticipated altitude, velocity and overlap parameters. In normal operation of the camera the pixel calibration lookup table function would be loaded with static conditions data which are generated under ideal or laboratory test conditions. To provide better imagery data the pixel calibration lookup table function may be calibrated for each particular flight or mission by generating dynamic pixel calibration data from the camera at the initiation of the flight. The dynamic pixel calibration data would then be calibration data from the camera at the initiation of the flight. The dynamic pixel calibration data would then be compared with the static pixel data and a modified lookup table would be generated which would better define the actual flight conditions.

During the setup procedure, the normal functions of various elements of the camera system would be tested to ensure proper operation. In the picture-taking mode the next step is to execute the fixed scan, as hereinabove described for the whisk broom type across flight line camera involves a sweep from starboard to port in approximately 0.75 seconds thereby transferring an image through the optical train to the electro-optical CCD sensor. The data output of the camera is in the order of 450 megapixels per second and as hereinabove described in connection with FIG. 4, the sensor head provides 32 parallel channels for the four line arrays with each having eight output ports. Imagery data is read from the electro-optical scanner in a burst mode with CCD line array having a plurality of parallel output sections and each section having four A/D converters, each sampling in a 14.28 mega-sample per second data rate with ten data bits of resolution. The analog signals are converted to digital signals through appropriate A/D converter circuits. The next step in the imagery data handling process is to calibrate the output signal from the individual pixel elements. For each CCD sensor output (there are 8096 pixels per array) as shown in FIG. 4, a conversion table is created which maps the 10-bit output from the A/D converter to a 8 bit output which is suitable for compression. This also reduces the data rate by 1.25:1. In addition as shown in FIGS. 14A and B the output of each pixel element is calibrated by creating a lookup conversion table data which depending upon the light intensity and the output of each individual pixel in terms of voltage is calibrated in the dynamic output. As hereinabove described, the ideal operation involves the dynamic data as used to modify the static calibration data table.

As hereinabove described, the calibration of the pixels is desirable prior to the data compression process in order to eliminate lines or streaks which may appear in the image data making them almost unusable and further complicating the compression algorithms which would treat such lines as picture data. Therefore by calibrating pixels before compression, additional advantages are gained in that the compression is less costly and more effective.

A major data rate reduction occurs by taking advantage of the camera's duty cycle. Although each frame of data is taken in about 0.75 seconds, pictures will be taken generally no faster than every 2 seconds. Thus by storing data in a buffer memory at the 0.75 second rate and reading it out at the 2 second rate yields a substantial 2.85:1 reduction in data rate.

The next step in the imagery data handling process is to compress the digitized data. There are a number of commercially available compression circuits, for example the National Imagery Transmission Format Standard (NITFS) or the JPEG which are commercially available as data compression chip sets. In the preferred embodiment, after compression it is anticipated that there will be two bits per pixel as opposed to the original ten bits per pixel thus yielding a 5:1 reduction in data rate which when combined with the other reductions, reduces the imagery data rate by a factor of more than 14:1.

The next step is to record the digital imagery data on appropriate magnetic recorders or similar memory devices. With the substantial data rate reductions described above, there are a number of magnetic recording systems capable of handling the imagery data, which as hereinabove described is at a peak data rate of 32 megabytes/second.

During initial setup, the frame start command triggers the calculation by the global position system receiver, not shown, in the aircraft which calculates the latitude/longitude coordinates at the time the frame start command is issued. The next step in the process is to record the latitude/longitude coordinate data for each frame start command pulse which can then be utilized to coordinate or address the storing of the data for each frame. As hereinabove described latitude/longitude coordinate data facilitates or permits the location of the frame and subframe data when stored. As shown, this latitude/longitude address data can be recorded with the recorded data imagery so that it is tracked and easily accessible in that manner. For high quality images, as hereinabove described, it is necessary to ensure that the electro-optical sensor's position and pointing is known with respect to the surface of the earth. In order to correct and calibrate imagery data, as hereinabove described, it is desirable to monitor the three degrees of motion of the electro-optical sensor. As described in connection with FIGS. 15, 16 and 17, locating a plurality of GPS units on the aircraft and on the ground can be utilized to determine not only the exact position of the aircraft and therefore the sensor arm within the aircraft, but also the roll, pitch and yaw motions of the sensor arm due to turbulence, etc.

Figure 17:
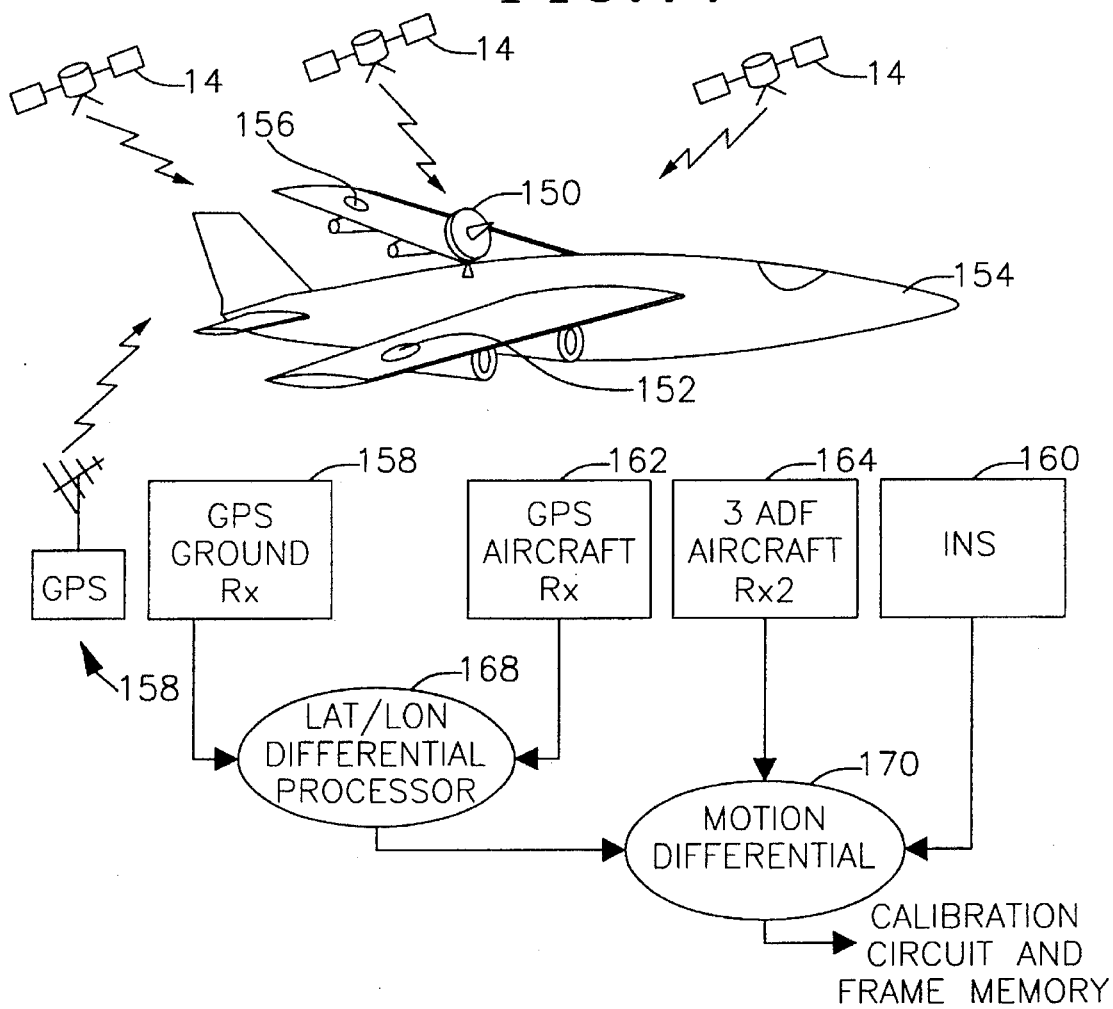
FIG. 17 is a block diagram of an error correction system and method for the improved sensor arm positioning mechanism utilizable in accordance with another aspect of applicants' invention.

This motion correction data is then correlated with, for example as shown in connection with FIG. 17, the inertial guidance data to give the exact position and of the sensor arm 16 (FIG. 3). By utilizing such motion correction data and the data from the same picture taken by the seam or overlap of the four line sensors, the digitized imagery data can be compared and corrected to eliminate errors which result when the film or image plane is not kept exactly parallel to the earth's surface during picture or frame operations.

Following the correction of the imagery data to eliminate panoramic and other types of errors, the corrected digitized data may be outputted to various users, for example being accessed by the lat/lon coordinates which were recorded with the digital data at the start of each frame.

Figure 15:
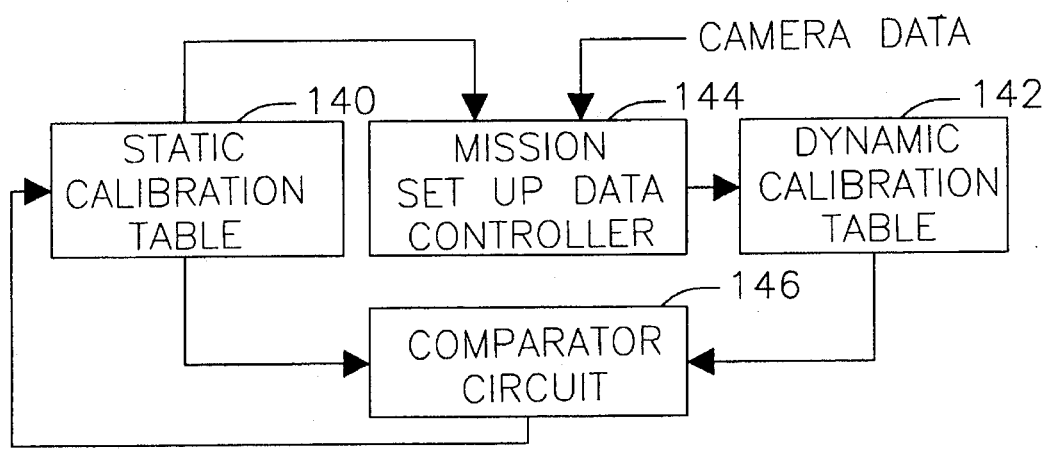
FIG. 15 is a block diagram of a dynamic calibration system utilizable in accordance with another aspect of applicants' improved airborne digital panoramic camera and method.

Referring now to FIG. 15 there is shown a logic block diagram of a dynamic calibration system in accordance with another aspect of applicants' invention. As hereinabove described, a static calibration table 140 is created by measuring the voltage out of each pixel for a controlled level of illumination as illustrated in FIGS. 14A and 14B. This calibration table data is utilized in correcting output variations between the individual pixel elements. In addition to the static calibration, for improved results it is desirable to incorporate dynamic calibration during an actual mission flight. The dynamic calibration table 142 in effect sets the exposure or shutter speed for actual mission conditions. In accordance with the dynamic calibration feature of applicants' improved camera, the initial step is to take a picture as the mission flight begins. The camera data along with the static calibration table data 140 are fed as inputs to the mission setup data controller 144. The mission data controller 144 calculates the DC offsets and gains for the new picture element data and compares it to the static calibration table data and feeds the output to a new dynamic calibration table unit 142. By recalculating the lookup table values and comparing them with the static calibration table in the comparator circuit 146, the appropriate offsets for the actual mission conditions are integrated into and reloaded into the static calibration table 140 which then would be utilized as hereinabove described in connection with FIG. 11. The static calibration table 140 and the dynamic calibration table 142 may comprise semiconductor or disk memory devices, for example MT5C1005DJ manufactured by Micron Technologies which include a separate memory location for each of the individual pixel elements. The mission data controller 144 comprises a processing unit, for example an Intel 486, which accepts the input data stream from the static calibration table 140 and the camera data taken from the calibration picture data and pairs them and loads the difference into the dynamic calibration table 142. The comparator circuit which, for example may comprise a comparator algorithm or an adder circuit of any known type, compares the input from the static calibration table and the dynamic calibration table for each pixel, and the difference being the variation of the dynamic calibration table 142 from the static calibration table values is reloaded into the static calibration table 140 for that flight.

Figure 16:
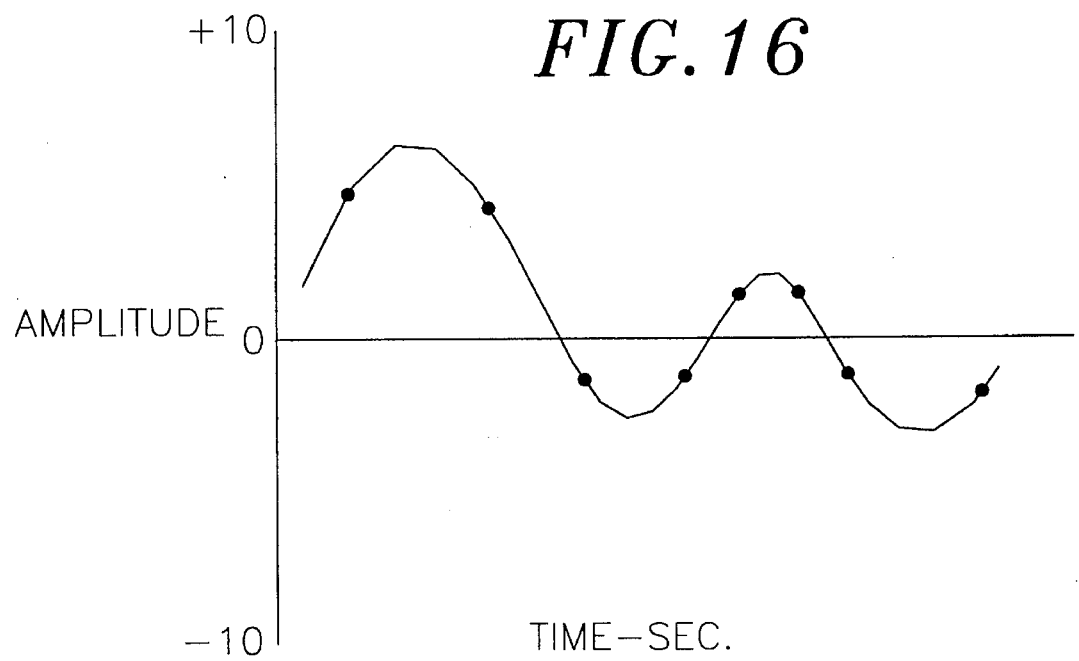
FIG. 16 is a graph of platform attitude parameters utilizable in accordance with a dynamic platform stabilization apparatus and process in accordance with another aspect of applicants' invention.

One of the principal problems with airborne panoramic cameras is the assumption that the camera pointing angle is fixed with respect to the ground. For any variation in the camera position relative to the normal position to the ground results in pointing errors. Referring now to FIG. 16, there is shown a graphic plot of the amplitude of variations which occur in normal flight as a function of time. The amplitude variations may be due to the roll, pitch or yaw type movements of the aircraft about the three axis as the plane is in flight due to variations in wind and general air turbulence. As illustrated in FIG. 16, the amplitude variations as a function of time may vary from −10 to +10 units. The graph illustrates several points 150 which represent the instantaneous variation at a point in time due to such variations in upper air turbulence. A similar graph would be made with regard to each of the major axis of the plane and would be indicative of the amplitude of the motion variations due to either roll, pitch or yaw movements of the aircraft about its normal line of flight.

Referring now to FIG. 17, there is shown a pictorial and block diagram of an improved motion compensation circuit which can be employed to further calibrate the pixel calibration table and unit 114 to correct panoramic errors in the imagery data. In the case of the airborne film-based reconnaissance systems, fixed ground points are commonly used to recalculate the film data. In accordance with applicants' improved airborne panoramic system and method, the instantaneous attitude of the aircraft at any instant in time and in reference to a known ground position enables post processing to correct pointing errors introduced by the movement of the aircraft about its normal flight path.

As shown in FIG. 17, aircraft 10 has four antennas, 150, 152, 154, and 156 which communicate with GPS satellites 14. In addition, one ground GPS unit 158 is operating simultaneously. The ground unit 158 can be in radio communication with the GPS 162 and 164 on plane 10 which thus yield real time differential correction data. The three ADF aircraft mounted receivers having antennas 152, 154 and 156 track the roll, pitch and yaw movements of the aircraft respectively. The GPS receivers on the aircraft and on the ground respectively through direct triangulation on the three or four GPS satellites 14 develop the latitude-longitude coordinates of the exact position on the aircraft antenna 150 within a few centimeters. By combining the inertial navigation system, shown schematically in block 160 which may be of the inertial platform or accelerometer type, yields a very high accuracy angular position of sensor arm 16 (FIG. 3) and when interpolated with the GPS data from antenna 150 yields position accuracy data for the GPS antenna 150 with a ±1 cm accuracy. Thus by using the dynamic calibration system described in FIG. 17, the position of sensor arm 16 can be calculated to better than 200 micro radians. With the differential GPS processors 168 in combination with the inertial navigation system motion differential dynamic error correction system described in FIG. 17 it is possible to remove any significant positional errors in the imagery data allowing the data to be ortho-rectified to the earth. Thus the primary errors introduced in digital panoramic airborne cameras, that of a moving focal point, can be corrected using applicants' dynamic calibration system and method.

As hereinabove described, comparison of remotely sensed spectral response data is useful in many applications including remote multi-spectral sensing of agriculture crops. Remote multi-spectral sensing for agriculture crops is primarily concerned with determining various crop parameters by analyzing spectral data to enable farmers to detect and correct crop conditions due, for example, to disease, weed or insect infection or fertilizer or irrigation needs. As shown in FIGS. 6A and 6B, utilizing applicants' improved electro-optical sensors and system facilitates the collection of imagery data by utilizing a plurality of color filters 63, 66 or 68. As described above, applicants' improved sensor arrays 60 and 62 have a spectral response superior to film systems.

Referring now to FIG. 18 there is shown a plot of spectral bands for blue, green, red, near infrared and infrared respectively which may be generated utilizing the combination of applicants' in-line optical sensors and the color filters 63–66 shown in FIGS. 6A and 6B. As hereinabove described, the biological mass or other properties of agricultural crops can be determined for example as a function of the ratio of green-yellow or other spectral data. Such data is useful to a farmer in detecting crop conditions such as disease, weed or insect infestation thereby permitting the farmer to take appropriate actions to correct or counteract such conditions to increase the quality and quantity of production.

Figure 19:
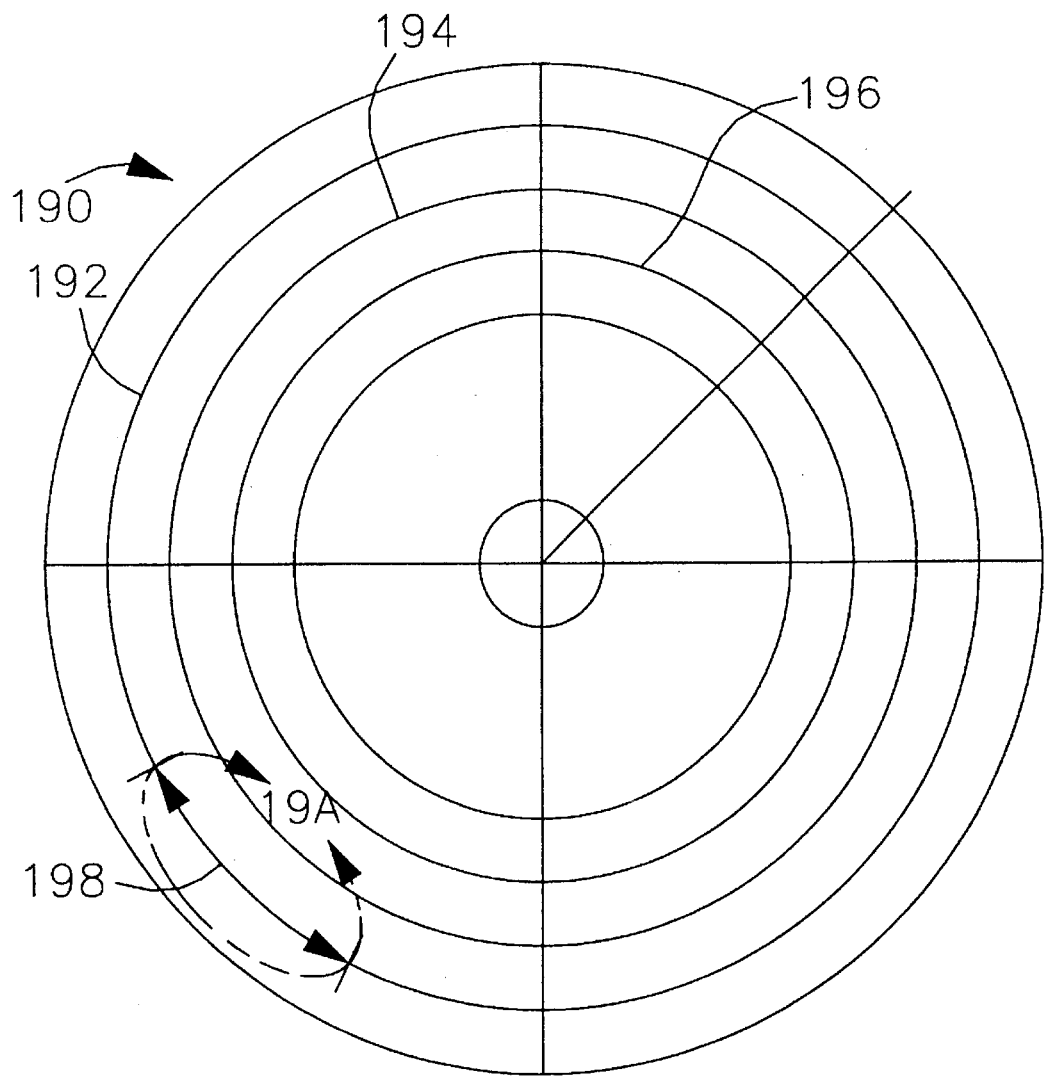
FIGS. 19 and 19A are a schematic logic illustration of data storage utilizable in applicants' improved airborne direct digital panoramic camera system and method.
Figure 19A:
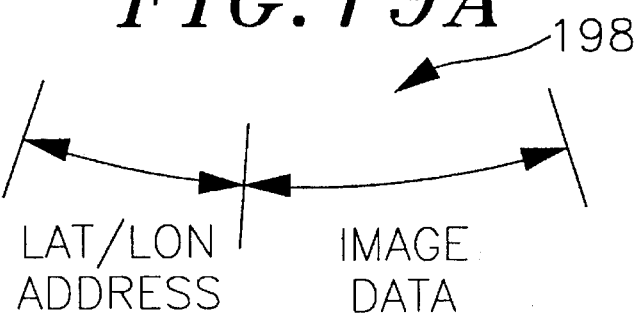

Referring now to FIG. 19, there is shown a diskette 190 having thereon magnetized tracks 192, 194 and 196. With reference to track 192, for example, an imagery data file 198 may be recorded as digital bits in a manner well known to those skilled in the computer arts. Along with the imagery data, related lat/ lon coordinate data may likewise be recorded on the same track in a combined address-data format or alternatively they may be related through an additional related addressing scheme. For example, as shown in FIG. 19A, by incorporating a tagging approach, related lat/lon coordinate data and the imagery data generated by that frame may be associated and recorded at predetermined addresses shown as 198 or through a scheme of look up tables well known to those skilled in the magnetic and recording arts. But in accordance with another aspect of applicants' invention, the imagery data file associated with each frame is preferably recorded with or proximate the corresponding lat/lon data as illustrated in FIG. 19A to enable easy access to the recorded imagery data. In this manner a convenient reference to the lat/lon coordinate data recorded at the time the frame imagery data was generated greatly simplifies accessing the associated imagery data. Thus by incorporating this lat/lon data tagging approach illustrated as 198 in FIG. 19, it is possible to access specific frame imagery data without the necessity for decompressing and searching an entire voluminous data file generated during a particular operation or mission.

While applicants' invention has been described with reference to several particular illustrative embodiments, it is not to be restricted by those embodiments but only by the appended claims. Those skilled in the art will appreciate that the illustrative embodiments can be changed or modified without departing from the scope of the present invention.

What is claimed is:

1. In a direct digital airborne whisk broom-type panoramic camera having an optical system for focusing a ground area to be imaged onto a focal plane, image motion compensation means for correcting aircraft motion during camera operation, a rockably mounted sensor arm for housing a lens and optical train, drive means for moving said sensor arm across the line of flight of the aircraft during camera operation, the improvement comprising:

electro-optical multi-port line array sensor means for converting images of said ground area to be imaged into analog electric image signals having an analog initial image data rate in the order of 150 to 450 million pixel signals per second, means for fixedly mounting said electro-optical sensor means on said sensing arm at the focal plane of the camera, image signal processing means for digitizing said analog image signals, data compression means for compressing said digitized image signals, and memory means for storing said compressed digitized image signals whereby the overall image data rate is substantially reduced before storage.

2. The improved airborne panoramic camera of claim 1 wherein said electro-optical multi-port line array sensor means comprises a plurality of pixel elements wherein the pixel pitch is in the range of 5 to 20 microns and additionally including buffer memory means for temporarily storing said digitized image signals and for slowing said data rate as a function of a frame duty cycle rate of said camera.

3. The improved airborne panoramic camera of claim 1 wherein said electro-optical multi-port line array sensor means has at least 8 output ports.

4. The improved airborne panoramic camera of claim 1 wherein said electro-optical multi-port line array sensor means comprises a plurality of parallel lines of pixel elements and wherein each of said plurality of parallel lines of pixel elements has a plurality of separate output ports.

5. The improved airborne panoramic camera of claim 4 wherein at least one group of said plurality of pixel lines are arranged in a staggered, overlapping arrangement with at least one of the others of said plurality of lines of pixel elements and wherein the overlapping pixel elements generate like image signals at different time intervals during each frame operation of the camera.

6. The improved panoramic camera of claim 2 wherein said multi-port line array includes a plurality of stages of time domain integration for each pixel element.

7. The improved airborne panoramic camera of claim 1 wherein said mounting means comprises means for mounting a plurality of front-side illuminated charge coupled devices comprising the electro-optical multi-port line array sensor means and for mounting a plurality of image signal amplifiers for amplifying said analog image signals generated by said sensor means.

8. The improved airborne panoramic camera of claim 7 wherein said plurality of image signal amplifiers includes signal conditioning means for performing a correlated double sampling process to reduce noise in the analog image signals.

9. The improved airborne panoramic camera of claim 8 wherein said signal conditioning means includes a plurality of sample-and-hold circuits and an analog subtracting amplifier for reducing noise from said analog image signals.

10. The improved airborne panoramic camera of claim 7 wherein said plurality of front-side illuminated charge couple devices are arranged in a plurality of offset parallel lines.

11. The improved airborne panoramic camera of claim 10 wherein one of said plurality of offset lines overlap operationally with others of said plurality of lines and thus generate like image signals at different times during each frame operation of the camera.

12. The improved airborne panoramic camera of claim 1 wherein the analog image signals have a peak data rate in the order of 300 to 1000 million pixel signals per second and wherein the maximum input data rate of said memory means is in the order of 8 to 32 megabits per second.

13. The improved airborne panoramic camera of claim 1 additionally including leveling buffer memory means for storing digitized image signals at a first data rate and for delivering the digitized image signals from the buffer memory at a second data rate which is substantially lower than said first data rate.

14. The improved airborne panoramic camera of claim 13 wherein said first data rate is in the order of 4000 megabits per second and said second data rate is in the order of 1400 megabits per second, thus effecting a data compression ratio in the order of 3 to 1.

15. The improved airborne panoramic camera of claim 1 wherein a differential data rate between the maximum data rate out of the camera of image signal data and the maximum input data rate for the memory means is in the order of 4000 megabits per second.

16. The improved airborne panoramic camera of claim 15 wherein the camera image signal data rate is in the order of 5000 megabits per second and the input data rate of said memory means is in the order of 4000 megabits per second.

17. The improved airborne panoramic camera of claim 2 additionally including optical filter means functionally associated with said array of pixel elements.

18. The improved airborne panoramic camera of claim 4 additionally including a plurality of optical filter means functionally associated with said pixel elements.

19. The improved airborne panoramic camera of claim 18 where one of said plurality of optical filter means have different spectral response characteristics and additionally including means for selecting ones of said plurality of optical filter means relative to ones of said pixel means.

20. The improved airborne panoramic camera of claim 1 additionally including differential global position system means for determining position data for said sensor arm in terms of latitude and longitude coordinates for each picture frame operation of the camera and data addressing means for tagging digitized image signals corresponding to a particular frame as a function of the determined latitude-longitude coordinate data.

21. The improved airborne panoramic camera of claim 20, additionally including a plurality of parallel data processing path means for processing in parallel segments of the digitized image signals and subframe addressing means for tagging each of said plurality of segments of a frame of image signals with its respective data address.

22. A method for generating and processing remote image data from a direct digital air-borne panoramic camera having a predetermined frame and picture cycle time of operation comprising the steps of:

generating analog image signals by exposing a multi-output port line array of pixel elements having in the order of 8 to 16 output data ports to illumination from an area to be imaged, converting said analog image signals into digital image signals, first reducing the output data rate of said digital image signals as a function of the frame cycle time and picture cycle time of said camera operations, further reducing the rate of said digital image data by subjecting the digital data to a compression algorithm process, and recording the compressed digital data in a digital memory device whereby the image data rate is substantially reduced before storage.

23. The method of claim 22 wherein the step of first reducing comprises the steps of reading said digital image signals into a digital memory at an input data rate in the order of 4000 megabits per second and reading said stored digital image signals out from said digital memory at an output data rate in the order of 1400 megabits per second.

24. The method of claim 22 further including the steps of generating a static calibrating data table with unique values for each pixel element, correcting said digital image signals as a function of said static calibrating data for each pixel element, and further reducing the data rate of said digital image signals by utilizing individual pixel calibration data.

25. The method of claim 22 further including the steps of generating static calibrating data with data conversion values for each pixel element, generating dynamic calibrating data with data derived from setup picture data representative of actual mission conditions, and correcting said digital image signals as a function of a differential between said static calibrating data and said dynamic calibrating data.

26. The method of claim 22 further including the steps of determining the exact latitude and longitude coordinates for the location of said line array of pixel elements by differential global position system techniques, and designating a memory storage location for digital image signals for each picture line sub-frame of camera operations as a function of the latitude-longitude coordinates data corresponding to the initiation of each respective picture line sub-frame operation of the camera.

27. The method of claim 26 further including the steps of determining the exact latitude and longitude coordinates of said pixel element array by triangulation calculations by a global position system receiver located on the airborne platform, determining an exact position of a predetermined point on the earth by means of triangulation calculation by a global position system receiver located on the ground in the area to be imaged, and determining the exact location of the ground sample to be imaged at the initiation of a camera photo frame operation by differential triangulation between the data from the airborne global position system receiver and the global position system receiver located on the ground in the area to be imaged.

28. The process of claim 24 including the additional steps of determining the magnitude of any motion of the pixel element array by comparing the differential outputs of three ADF receivers fixedly mounted on the airborne platform and the output of an inertial guidance system monitoring the motion of said pixel element array, and correcting any panoramic errors introduced into the digital image signals by any roll, pitch or yaw movements of the airborne platform or pixel element array.

29. The process of claim 28 wherein the step of correcting is within the range of 50 to 200 micro radians.

30. An improved direct digital airborne panoramic camera comprising:

lens means for focusing a ground area to be imaged onto a focal plane, image motion compensation means for compensating for aircraft motion during camera operations, a movably mounted sensor arm for housing said lens means, drive means for moving said sensor arm during camera operation, multi-port line array sensor means responsive to incident radiation through said lens means for converting images of said ground area into analog electric image signals having an analog output image data rate in the order of 150 to 450 million pixel signals per second, means for fixedly mounting said sensor means on said sensor arm at the focal plane of the camera, image signal processing means for digitizing said analog image signals, data compression means for compressing said digitized image signals, and memory means for storing said digitized image signals whereby the output data rate of said compressed digitized image signals is substantially reduced before storage.

31. The improved airborne panoramic camera of claim 30 wherein said multi-port line array sensor means comprises a plurality of parallel lines of pixel elements, each line including a plurality of pixel elements wherein the pixel pitch is in the range of 5 to 20 microns.

32. The improved panoramic camera of claim 30 additionally including output controller processor means for controlling the input and output data rate of said memory means.

33. The improved camera of claim 31 wherein each said parallel line of pixel elements of said sensor means includes at least 8 output signal ports.

34. The improved camera of claim 30 wherein said sensor means comprises a plurality of parallel line arrays and wherein at least one line array is arranged in a spaced apart overlapped arrangement with at least another one of said plurality of line arrays.

35. The improved camera of claim 33 wherein at least one of said sensor means comprises an infrared sensing element.

36. The improved camera of claim 30 additionally including a plurality of color filter means for filtering portions of the spectrum of incident radiation passing through said lens means.

37. The improved camera of claim 30 additionally including buffer memory means for storing said digitized image signals at a first data rate and for delivering said digitized image signals from said memory at a second data rate which is substantially lower than said first data rate.

38. The method of claim 22 additionally including the steps of generating latitude/longitude coordinate data associated with each frame of camera operation, and accessing a portion of said compressed digital data stored in said digital memory utilizing said latitude/longitude coordinate data for a specific frame of compressed data.

39. The method of claim 38 wherein the step of accessing includes the step of determining the latitude/longitude data for the center of a frame said compressed data.

40. The improved panoramic camera of claim 1 additionally including means for generating latitude/longitude data associated with each initiation of picture frame of camera operation, and means for tagging each portion of said compressed digital data associated with each frame of camera operation with its associated latitude/longitude data.

41. The method of claim 22 wherein the step of generating analog image signals includes the step of converting image-wise radiation into analog image signals utilizing a plurality of parallel, offset sensor arrays to generate gap image data signals, and additionally including the step of correcting panoramic type errors in said digital image signals as a function of said gap image data.

42. The improved panoramic camera of claim 1 wherein said sensor means comprises a plurality of parallel lines of sensor elements arrayed in a staggered, overlapped arrangement, and additionally including means for correcting panoramic type errors in said digital image signals as a function of data from said overlapped sensor elements.

* * * * *